(12) United States Patent
Brouwer et al.

(10) Patent No.: US 10,743,479 B2
(45) Date of Patent: Aug. 18, 2020

(54) SOD HANDLING APPARATUS

(71) Applicant: 1045929 ONTARIO LIMITED, Keswick (CA)

(72) Inventors: Gerardus J. Brouwer, Keswick (CA); Ralph Ratsep, Pefferlaw (CA); Robert Milwain, Keswick (CA); Mathias Marie Gerardus Hendriks, Heythuysen (NL)

(73) Assignee: 1045929 Ontario Limited, Keswick (CA)

( * ) Notice: Subject to any disclaimer, the term of this patent is extended or adjusted under 35 U.S.C. 154(b) by 358 days.

(21) Appl. No.: 15/543,270

(22) PCT Filed: Jan. 15, 2016

(86) PCT No.: PCT/CA2016/050033
§ 371 (c)(1),
(2) Date: Jul. 13, 2017

(87) PCT Pub. No.: WO2016/112465
PCT Pub. Date: Jul. 21, 2016

(65) Prior Publication Data
US 2017/0367270 A1    Dec. 28, 2017

Related U.S. Application Data

(60) Provisional application No. 62/104,224, filed on Jan. 16, 2015.

(51) Int. Cl.
*A01G 20/15* (2018.01)

(52) U.S. Cl.
CPC .................................. *A01G 20/15* (2018.02)

(58) Field of Classification Search
CPC ........................................................ A01G 20/15
USPC ............................................................. 47/56
See application file for complete search history.

(56) References Cited

U.S. PATENT DOCUMENTS

| 5,269,379 A | 12/1993 | Millar et al. |
| 6,112,680 A | 9/2000 | Hummer |

(Continued)

FOREIGN PATENT DOCUMENTS

| CA | 2413622 A1 | 2/2004 |
| CA | 2462015 A1 | 1/2005 |

(Continued)

OTHER PUBLICATIONS

Trotereau, Damien, "Extended European Search Report", dated Sep. 12, 2019. European Application No. 19187873.5. 15 pages.

(Continued)

*Primary Examiner* — Claude J Brown
(74) *Attorney, Agent, or Firm* — Bereskin & Parr LLP/S.E.N.C.R.L., s.r.l.

(57) ABSTRACT

A method of stacking sod rolls can include the steps of: a) moving a head of a sod handling apparatus into a sod pickup location containing a plurality of sod rolls; b) picking-up a first sod roll with a first sod carrier, picking-up a second sod roll with a second sod carrier, and picking-up a third sod roll with a third sod carrier; c) moving the head to a sod drop-off location; d) releasing the first sod roll from the first sod carrier at the sod drop-off location; e) after releasing the first sod roll, moving the second sod carrier toward the first sod carrier and moving the third sod carrier toward the first sod carrier to reduce the spacing between the second and third rolls of sod; and f) depositing the second sod roll and third sod roll at the drop-off location.

11 Claims, 24 Drawing Sheets

(56) References Cited

U.S. PATENT DOCUMENTS

| | | | |
|---|---|---|---|
| 6,527,502 B2* | 3/2003 | Leijenaar | A01G 20/15 414/792 |
| 7,066,277 B2 | 6/2006 | Hendriks et al. | |
| 8,196,982 B1* | 6/2012 | Crunkelton | A01G 20/15 294/61 |
| 2004/0188107 A1* | 9/2004 | Hendriks | A01G 20/15 172/20 |
| 2005/0000705 A1 | 1/2005 | Brouwer et al. | |

FOREIGN PATENT DOCUMENTS

| | | |
|---|---|---|
| CA | 2508351 A1 | 11/2005 |
| CA | 2504994 A1 | 1/2006 |
| EP | 1500320 B1 | 10/2008 |
| EP | 1521517 B1 | 5/2011 |

OTHER PUBLICATIONS

EPO, Third Party Observations. Document filed in counterpart EP Patent. No. 32444718, Applicaton No. 16737009.7, dated Feb. 4, 2020. 9 pages.

YouTube. Video clip showing the operation of a Robomax turf harvester, Feb. 13, 2014. https://www.youtube.com/watch?v=kM-eP61PZi8.

EPO, Notice to Respond to 3rd Party Observations. Document filed in counterpart EP Application No. 16737009.7, dated Feb. 17, 2020. 3 pages.

\* cited by examiner

SOD HANDLING APPARATUS

CROSS-REFERENCE TO RELATED APPLICATIONS

This is a national stage application of International Application No. PCT/CA2016/050033 flied on Jan. 15, 2016, which of U.S. Provisional Patent Application No. 62/104,224, filed Jan. 16, 2015, and entitled Sod Handling Apparatus. Each of these applications is incorporated herein in its entirety by reference.

FIELD

The present subject matter of the teachings described herein relates generally to a sod handling apparatus.

BACKGROUND

U.S. Pat. No. 6,779,610 (Brouwer et al.) relates to a sod harvester having a conveyor assembly to receive sod from a cutting head, a roll-up mechanism to form rolls from the cut sod, and a storage conveyor to receive a set of formed sod rolls, with a clamp to clamp the set of sod rolls and transfer it to a pallet. A diverter between the conveyor assembly and the storage conveyor normally allows sod rolls to travel to the storage conveyor but can be moved to create a gap through which defective sod rolls fall and are thereby rejected. A deflector located below the gap deflects scrap sod and defective sod rolls onto the cut portion of the sod field, rather than onto the uncut portion, so that the scrap sod deflected onto the field will not interfere with the next pass of the cutting head.

U.S. Patent Publication No. 2005/0000705 (Brouwer et al.) relates to a sod pick-up mechanism for a sod harvester has in one embodiment a set of hooks mounted on rotatable shafts. The hooks can be rotated through a grid into sod rolls or sod slabs located below the grid, to penetrate the sod rolls or slabs and pin them to the underside of the grid, after which the set of rolls or slabs thus retained can be moved to an appropriate stacking location such as a pallet. In another embodiment arms press against the ends of the sod rolls exerting pressure on them to retain them for pick up. If desired, the sod rolls can be arranged e.g., in sets of three, end-to-end, in the form of an arch to prevent the middle roll from dropping out. Pins which penetrate the sod rolls can be used to help retain the sod rolls while they are being moved. Other embodiments comprise clamps for engaging sod rolls from opposite sides or ends and a sod slab pick-up arrangement comprising a first screen which engages the grass side of the slabs so that the grass projects through openings in the screen, and a second screen that engages the projecting grass and traps it between to the two screens.

U.S. Pat. No. 6,112,680 (Hummer) relates to an apparatus for securing heavy sections of turf for initial placement, replacement and/or rotation is provided. The apparatus includes a frame for placement on a section of turf. A number of spaced apart actuators are mounted to the frame. Each actuator has an actuator rod with a sharpened end which is movable between a first, retracted position and a second, extended position. The actuator rods have an insertion angle of approximately 60° or less with respect to a contact surface such that upon actuation, the actuator rods are moved from the retracted position to the extended position and the sharpened ends of the actuator rods are adapted to pierce the selected section of turf to firmly engage the section of grass turf to the frame for placement or replacement. After the selected section of turf is positioned, the actuator rods are moved from the extended position to the retracted position resulting in the section of turf having a surface which is available for immediate use due to the insertion angle of the actuator rods resulting in reduced overhead observable piercing openings.

SUMMARY

This summary is intended to introduce the reader to the more detailed description that follows and not to limit or define any claimed or as yet unclaimed invention. One or more inventions may reside in any combination or subcombination of the elements or process steps disclosed in any part of this document including its claims and figures.

In accordance with one aspect of the teaching described herein, a sod handling apparatus for picking up rolls of sod can include a head and a first sod carrier mounted to the head and operable to pick-up a first roll of sod. A second sod carrier can be operable to pick-up a second roll of sod and can be movably mounted to the head. The second sod carrier can be offset from the first sod carrier in a first direction. A third sod carrier can be operable to pick-up a third roll of sod and can be movably mounted to the head. The third sod carrier can be disposed between the first sod carrier and the second sod carrier. The sod handling apparatus can be adjustable into at least an extended configuration, and at least one of a first contracted configuration and a second contracted configuration. In the extended configuration the third sod carrier can be spaced apart from the first sod carrier in the first direction by a first offset distance and the second sod carrier can be spaced apart from the third sod carrier in the first direction by a second offset distance that is generally equal to the first offset distance. In the first contracted configuration, the third sod carrier can be spaced apart from the first sod carrier in the first direction by a third offset distance that is less than the first offset distance, and the second sod carrier can be spaced apart from the third sod carrier in the first direction by a fourth offset distance that is generally equal to the third offset distance. In the second contracted configuration, the third sod carrier can be spaced apart from the first sod carrier in the first direction by a fifth offset distance that is less than first offset distance, and the second sod carrier can be offset from the third sod carrier in the first direction by a sixth offset distance that is different than the fifth offset distance.

When the sod handling apparatus is in the second contracted configuration the third sod carrier can be positioned such that a roll of sod carried by one of the first sod carrier and the third sod carrier can overlap the other of the first sod carrier and the third sod carrier in the first direction.

The fifth offset distance can be less than 75% of the first offset distance.

The first and third sod carriers can be configured to pick up rolls of sod having a roll diameter and the fifth offset distance can be less than the roll diameter.

The sixth offset distance can be generally equal to or greater than the second offset distance.

The fifth offset distance can less than about 7 inches.

The sod handling apparatus can include a frame extending in the first direction and the second sod carrier and third sod carrier can be translatably mounted to the frame and the second sod carrier can be translatable independently of the third sod carrier and the first sod carrier need not be translatable relative to the frame.

The sod handling apparatus can be configurable in a third contracted configuration. In the third contracted configuration the third sod carrier can be offset from the first sod carrier by a seventh offset distance that is less than the fifth offset distance, and the second sod carrier can be offset from the third sod carrier by an eighth offset distance that is less than the second offset distance.

The eighth offset distance can be equal to the fourth offset distance and the seventh offset distance can less than the third offset distance.

The eighth offset distance can be less than 9 inches and the seventh offset distance can be less about 6 inches.

When the sod handling apparatus is in the third contracted configuration the third sod carrier may partially overlap with the first sod carrier in the first direction.

The first sod carrier may include a first gripper for gripping the first roll of sod, the second sod carrier may include a second gripper for gripping the second roll of sod and the third sod carrier includes a third gripper for gripping the third roll of sod, and wherein the first gripper is operable independently of the second and third grippers.

The first gripper may include at least a first elongate piercing member having a first tip at a distal end thereof, the first piercing member may be moveable between a retracted position spaced apart from the first roll of sod and an engaged position wherein the first piercing member penetrates an outer surface of the first roll of sod. When moving between the retracted and engaged position the first tip may travel in a first piercing direction that is at a first angle of between about 45 degrees and about 90 degrees relative to the first direction.

The sod roll may define a longitudinal direction extending along a roll axis about which the sod roll is rolled, and when moving between the retracted position and the advanced position, the at least one piercing member may penetrates the sod roll in the longitudinal direction.

The first gripper may include a second elongate piercing member having a second tip at a distal end thereof, the second piercing member being moveable between a retracted position and an engaged position. When the first and second piercing members are in the engaged position the first and second piercing members may at least partially overlap each other in the longitudinal direction.

The head may include a central plane extending in the first direction, and when moving between the retracted and engaged position the first tip may travel from a first side of the central plane to an opposed second side of the central plane.

The first sod carrier may have a width in the first direction that is less than about 7 inches.

A first actuator may be drivingly connected to the second sod carrier and third sod carrier, and may be operable to move the second sod carrier and the third sod carrier between the extended configuration and the first retracted configuration.

A second actuator may be drivingly connected to the second sod carrier and third sod carrier and may be operable to move the second sod carrier and the third sod carrier between the extended configuration and the second retracted configuration.

The first actuator may be mounted to at least one of the second sod carrier and the third sod carrier and may be movable in unison with the second sod carrier and the third sod carrier when the sod handling apparatus is moved between the extended configuration and the second retracted configuration.

In accordance with another aspect of the teaching disclosed herein, a sod handling apparatus for picking-up rolls of sod from an accumulator may include a head extending in a first direction, a first sod carrier, a second sod carrier positioned on a first side of the first sod carrier and translatable relative to the first sod carrier in the first direction, a third sod carrier positioned between the second sod carrier and the first sod carrier and translatable relative to the first sod carrier in the first direction, a fourth sod carrier positioned on a second side of the first sod carrier and translatable relative to the first sod carrier in the first direction and a fifth sod carrier positioned between the fourth sod carrier and the first sod carrier and translatable relative to the first sod carrier in the first direction. An actuator mechanism may translate the second, third, fourth and fifth sod carriers toward and away from the first sod carrier. The sod handling apparatus may be configurable in an extended configuration in which each sod carrier is spaced apart from an adjacent sod carrier by a first distance in the first direction. The sod handling apparatus may be configurable in a first contracted configuration in which each sod carrier is spaced apart from the adjacent sod carrier by a second distance in the first direction that is less than the first distance The sod handling apparatus may be configurable in a second contracted configuration in which the third and fifth sod carriers are spaced from the first sod carrier by a third distance that is less than the first distance, the second sod carrier is spaced from the third sod carrier by a fourth distance that is different than third distance and the fourth sod carrier is spaced from fifth sod carrier by a fifth distance that is different than the third distance.

The first sod carrier may be fixedly coupled to the head.

The fourth distance may be equal to the fifth distance.

The fourth distance may equal to or greater than the first distance.

The second sod carrier and third sod carrier may be movable independently of each other.

The second sod carrier and fourth sod carrier may be connected to move in unison with each other toward and away from the first sod carrier.

The third and fifth sod carriers may be connected to move in unison with each other toward and away from the first sod carrier.

The second sod carrier and third sod carrier may be movable independently of the fourth sod carrier and fifth sod carrier.

When the sod handling apparatus is in the second contracted configuration the third sod carrier and fifth sod carriers may partially overlap with the first sod carrier in the first direction.

The third distance may be less than about 7 inches.

When sod handling apparatus is in the second contracted position the third and fifth sod carriers may at least partially block the first sod carrier from gripping a sod roll.

When changing from the extended configuration to the first contracted configuration the first sod carrier may remain stationary and the second, third, fourth and fifth sod carriers may each translate inwardly toward the first sod carrier.

In accordance with another aspect of the teachings described herein, a method of stacking sod rolls using a sod handling apparatus can include the steps of:

a) moving a head of a sod handling apparatus into a sod pick-up location containing a plurality of sod rolls, the head including a first sod carrier, a second sod carrier on a first side of the first sod carrier and a third sod carrier on an opposing second side of a first sod carrier;

b) picking-up a first sod roll with the first sod carrier, picking-up a second sod roll with the second sod carrier, and picking-up a third sod roll with the third sod carrier;

c) moving the head to a sod drop-off location;

d) releasing the first sod roll from the first sod carrier at the sod drop-off location;

e) after releasing the first sod roll, moving the second sod carrier toward the first sod carrier and moving the third sod carrier toward the first sod carrier to reduce a distance between the second and third rolls of sod; and f) depositing the second sod roll and the third sod roll at the drop-off location.

After completing step e) a distance between the second and third rolls of sod may be less than a diameter of the second sod roll.

After completing step e) the second sod roll may be in physical contact with the third sod roll.

In step e) a distance between the second sod carrier and the third sod carrier may be in a range of about 100% to about 150% of a diameter of the second sod roll.

The second and third sod carriers may be translatable in a first direction and when completing steps d) to f) the head may be moved in the first direction by a first positioning distance that in a range of about 0% to about 150% of the diameter of the second sod roll.

The second sod roll may have a length in a second direction that is orthogonal to the first direction and when completing steps d) to f) the head may be moved by a second positioning distance in the second direction and the second positioning distance may be between about 0% and about 25% of the length of the second sod roll.

After completing step e) the second sod roll and third sod roll may be above and at least partially overlie the first sod roll.

After step f) the second sod roll and the third sod roll may be stacked on top of the first sod roll.

During steps b) to f) the first sod carrier may remain fixed relative to the head.

The sod handling apparatus may also include a fourth sod carrier on the first side of the first sod carrier and outboard of the second sod carrier, and a fifth sod carrier on the second side of the first sod carrier and outboard of third sod carrier. Step b) may include picking up a fourth sod roll with the fourth sod carrier and picking-up a fifth sod roll with the fifth sod carrier. Step e) may include moving the fourth sod carrier inwardly toward the second sod carrier and moving the fifth sod carrier inwardly toward the third sod carrier. Step f) may include depositing the fourth and fifth sod rolls at the sod drop-off location.

After completing step e) a distance between the fourth sod roll and the second sod roll may be greater than a distance between the second sod roll and the third sod roll.

The method may include the steps of:

g) returning the head to the sod pick-up location containing the plurality of sod rolls;

h) picking-up a fourth sod roll with the first sod carrier, picking-up a fifth sod roll with the second sod carrier, and picking-up a sixth sod roll with the third sod carrier; and i) after completing step h) moving the head to the sod drop-off location and simultaneously depositing the fourth, fifth and sixth sod rolls.

In accordance with another aspect of the teachings described herein, a method of stacking rolls of sod using a sod handling apparatus including first, second, third, fourth and fifth sod carriers, the second and fourth sod carriers being disposed on a first side of the first sod carrier and the third and fifth sod carriers being disposed on an opposed, second side of the first sod carrier, can include the steps of:

a) positioning a head of the sod handling apparatus in a sod pick-up location containing a plurality of rolls of sod;

b) picking up one roll of sod with each of the first, second, third, fourth and fifth sod carriers;

c) positioning the head in a sod drop-off location;

d) depositing the roll of sod carried by the first sod carrier;

e) after step d), moving the second, third, fourth and fifth sod carriers inwardly toward the first sod carrier; and f) after step e), depositing the rolls of sod carried by the second, third, fourth and fifth sod carriers.

The rolls of sod dropped from the second and fourth sod carriers in step f) may at least partially overlie the roll of sod dropped by the first sod carrier in step d).

The roll of sod dropped in step d) may form part of a first sod layer, and the rolls of sod dropped in step f) may form part of a second sod layer that is stacked on top of the first sod layer.

After completing step e) the second sod carrier and the third sod carrier may be spaced apart from each other by a first distance, the fourth sod carrier may be spaced from the second sod carrier by a second distance that is greater than the first distance, and the fifth sod carrier may be spaced from the third sod carrier by the second distance.

In accordance with another aspect of the teachings described herein, a sod handling apparatus for picking up a sod roll that is rolled about a roll axis may include a first gripper positionable to grip the first sod roll. The first gripper may include at least a body member having a body axis that is parallel to the roll axis when the first sod roll is engaged by the first gripper and a first elongate piercing member operably coupled to the body and having a first tip at a distal end thereof. The first elongate piercing member may be moveable between a retracted position spaced apart from the first sod roll and an engaged position penetrating the first sod roll. When the first gripper is moved between the retracted position and the engaged position the first tip may travel in a first piercing direction that is at a first angle of between about 0 degrees and about 45 degrees relative to the body axis. A second elongate piercing member may be operably coupled to the body. The second elongate piercing member may be generally opposing the first elongate piercing member and may have a second tip at a distal end thereof. The second elongate piercing member may be moveable between the retracted position and the engaged position. When the second gripper is moved between the retracted position and the engaged position the second tip may travel in a second piercing direction that is at a second angle of between greater than 0 degrees and about 45 degrees relative to the body axis. An actuator may be operably coupled to the first and second elongate piercing members to move the first piercing member between the retracted position and the engaged position and to move the second piercing member between the retracted position and the engaged position.

The first angle may be between about 5 and 30 degrees, and may be about 15 degrees.

The second angle may be between about 5 and 30 degrees and may be about 15 degrees.

The first piercing direction may be parallel to the second piercing direction.

When the first piercing member moves from the retracted position to the first engaged position the first tip may pierce an upper surface or an end face of the first sod roll.

The first gripper may have a central plane that is orthogonal to the body axis. When the first elongate piercing member is in the retracted position the first tip is on a first side of the central plane and when the first elongate piercing member is in the engaged position the first tip may be on an opposed second side of the central plane.

When the second elongate piercing member is in the second retracted position the second tip may be on the second side of the central plane and when the second elongate piercing member is in the engaged position the second tip may be on the first side of the central plane.

The actuator may be operable to move the first and second elongate piercing members in unison.

In accordance with another aspect of the teachings described herein, a method of stacking sod rolls on a pallet using a sod handling apparatus, the sod rolls having a roll axis on a pallet using a sod handling apparatus may include the steps of:

a) positioning a pallet in a sod drop-off area, the pallet having opposing first and second edges that are spaced apart from each other in a first direction, and opposing third and fourth edges that extend between the first and second edges are spaced apart from each other in a second direction that is orthogonal to the first direction;

b) forming a first layer containing nine sod rolls by i) orienting a first set of five sod rolls so that their respective roll axes extend in the second direction and positioning the five sod rolls next to each other to form a first row extending in the first direction between the first and second edges of the pallet, wherein each sod roll in the first set of five sod rolls comprises a respective first end adjacent the third edge of the pallet and a respective second end that is axially spaced from the first end;

ii) orienting sixth and seventh sod rolls so that their respective roll axes extend in the first direction and positioning the sixth and seventh sod rolls between the first row and the fourth edge of the pallet so that a respective first end of each of the sixth and seventh sod rolls is adjacent the first edge of the pallet, the sixth sod roll is adjacent the second ends of at least two of the sod rolls in the first row and the seventh sod roll is adjacent the fourth edge of the pallet;

iii) orienting eighth and ninth sod rolls so that their respective roll axes extend in the first direction and positioning the eighth and ninth sod rolls between the first row and the fourth edge of the pallet so that a respective first end of each of the eighth and ninth sod rolls is adjacent the second edge of the pallet, the eighth sod roll is aligned with the sixth sod roll and is adjacent the second ends of at least two of the sod rolls in the first row, and the ninth sod roll is aligned with the seventh sod roll and is adjacent the fourth edge of the pallet.

The method may include forming a second layer containing nine sod rolls on top of the first layer, by i) orienting a second set of five sod rolls so that their respective roll axes extend in the second direction and positioning the five sod rolls next to each other to form a second row that is parallel to the first row and is positioned on top of the sixth, seventh, eighth and ninth sod rolls of the first layer, wherein each sod roll in the second set of five sod rolls comprises a respective first end adjacent the fourth edge of the pallet and an respective second end that is axially spaced from the first end;

ii) orienting sixth and seventh sod rolls of the second layer so that their respective roll axes extend in the first direction and positioning the sixth and seventh sod rolls of the second layer on top of the first row so that a respective first end of each of sixth and seventh sod rolls of the second layer is adjacent the first edge of the pallet, the sixth sod roll of the second layer is adjacent the second row and the seventh sod roll of the second layer is adjacent the third edge of the pallet;

iii) orienting eighth and ninth sod rolls of the second layer so that their respective roll axes extend in the first direction and positioning the eighth and ninth sod rolls of the second layer on top of the first row so that a respective first end of each of the eighth and ninth sod rolls of the second layer is adjacent the second edge of the pallet, the eighth sod roll of the second layer is aligned with the sixth sod roll of the second layer and adjacent the second row, and the ninth sod roll of the second layer is aligned with the seventh sod roll of the second layer and is adjacent the third edge of the pallet.

The sixth and seventh sod rolls of the first layer and the sixth and seventh sod rolls of the second layer may be placed on the pallet simultaneously.

The method may include simultaneously carrying the sixth and seventh sod rolls of the first layer and sixth and seventh sod rolls of the second layer using the sod handing apparatus. The sixth and seventh sod rolls of the first layer and sixth and seventh sod rolls of the second layer may be placed on the pallet without translating the sod handling apparatus in a horizontal direction.

At least one of steps b)i), b)ii) and biii) may be performed simultaneously with at least one of the steps of i), ii) and iii).

Step b)ii) and step ii) may be performed simultaneously with each other, and then step b)iii) and step iii) may be performed simultaneously with each other.

Step i) may be performed after completing steps ii) and ii).

Step b)i) may be performed before steps b)ii) and b)iii).

Optionally, steps i)-iii) may only performed after all of the steps have been completed.

The method may include using a sod handling apparatus to simultaneously pick up the sixth and seventh sod rolls of the first layer and sixth and seventh sod rolls of the second layer from a pick-up location, translating the sod handling apparatus to a first drop off location above the pallet and then depositing sixth and seventh sod rolls of the first layer and sixth and seventh sod rolls of the second layer onto the storage location without further translating the sod handling apparatus.

After completing the preceding steps, the method may include returning the sod handling apparatus to the pick-up location to simultaneously pick up the eighth and ninth sod rolls of the first layer and the eighth and ninth sod rolls of the second layer, translating the sod handling apparatus to a second drop off location above the pallet and then depositing the eighth and ninth sod rolls of the first layer and the eighth and ninth sod rolls of the second layer onto the storage location without further translating the sod handling apparatus.

After completing the preceding steps, the method may include returning the sod handling apparatus to the pick-up location to simultaneously pick up the second set of five sod rolls, translating the sod handling apparatus to a third drop off location above the pallet and then placing the second set of five sod rolls onto the storage location.

In accordance with another aspect of the teachings described herein, a sod handling apparatus for picking up rolls of sod can include a head and a first sod carrier mounted to the head. The first sod carrier may be operable to pick-up a first roll of sod. A second sod carrier may be operable to pick-up a second roll of sod and may be movably mounted to the head. The second sod carrier may be translatable along the first direction relative to the first sod carrier. A third sod carrier may be operable to pick-up a third roll of sod and may be movably mounted to the head. The third sod carrier may be translatable along the first direction relative to the first sod carrier. The second and third sod carriers may be each independently translatable toward and away from the first sod carrier along the first direction.

The first sod carrier may not be translatable in the first direction.

The second sod carrier and third sod carrier may be disposed on a first side of the first sod carrier, and optionally a fourth sod carrier and a fifth sod carrier may be mounted to the head and may be disposed on an opposing second side of the first sod carrier.

Each sod roll picked up using the sod handling apparatus may have a roll axis about which the sod roll is rolled, and when the sod handling apparatus is in use, the first direction may be substantially horizontal and is transverse to the roll axis.

DRAWINGS

The drawings included herewith are for illustrating various examples of articles, methods, and apparatuses of the teaching of the present specification and are not intended to limit the scope of what is taught in any way.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Figure 1:
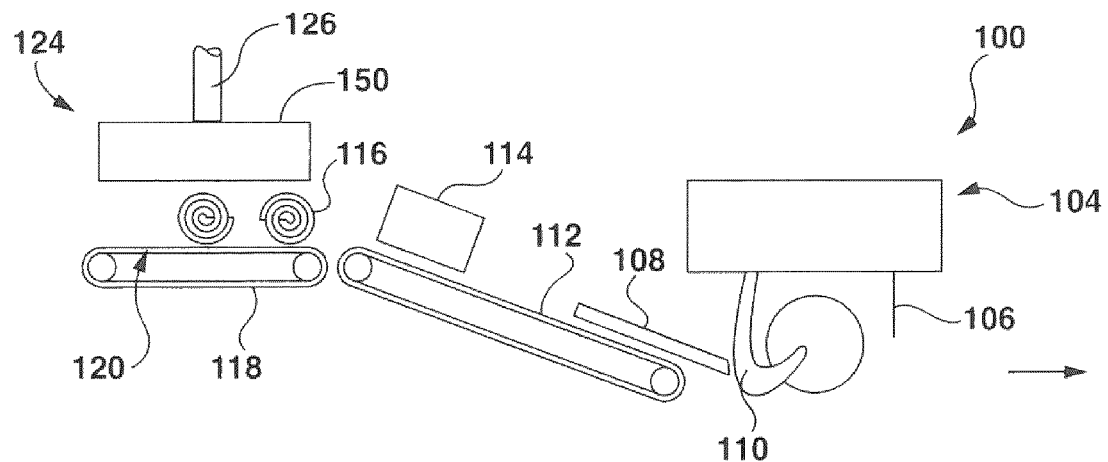
FIG. 1 is a schematic representation of portions of a sod harvesting apparatus.

Reference is made to FIG. 1, which shows a simplified schematic view of portions of a sod harvester 100. The sod harvester 100 is intended to be mounted to a supporting vehicle, such as a tractor in the illustrated example, but alternatively may be towed by a towing vehicle or may be self-propelled. For example, sod harvesters may be attached to a tractor for propulsion, or may be self-propelled. One example of a typical prior art sod harvester is a sod harvester produced by Kesmac Inc. of Keswick, Ontario, Canada, for attachment to a tractor as shown in U.S. Pat. Nos. 6,779,610 and 7,096,967, each of which is incorporated herein by reference in their entirety. Another example of a sod harvester is shown in U.S. Pat. No. 8,813,861, and U.S. Pat. Pub. No. 2005/0000705, each of these publications being incorporated herein by reference in their entirety. The exemplary embodiments described herein may also equally applicable to a self-propelled sod harvester, such as that shown in U.S. Pat. No. 4,966,239, incorporated herein by reference in its entirety, and/or to a towable sod harvester.

The sod harvester 100 is intended to cut strips of sod from the ground and to roll-up the strips of sod to produce sod rolls which can be stacked on a pallet, or other storage member.

The sod harvester 100 may include any suitable sod cutting apparatus, such as cutting head 104, which includes a cross cut blade 106, and optionally may include any suitable sod cutting components, such as a ground roller located behind the cross cut blade. The cross cut blade 106 may be driven downwardly at periodic intervals (by any suitable conventional mechanism) to form a transverse cut in the ground, so that the strip of sod which is to be cut by the cutting head will be cut into individual slabs 108, each of which can be formed into a roll. The cutting head 104 may also include a conventional undercutting knife 110, which may include side cutting blades, one at each side thereof. The undercutting knife 110 can be mounted on arms which are reciprocated forwardly and rearwardly in conventional fashion by a hydraulic motor (not shown), to cut a strip of sod.

Optionally, the cutting head 104 can be mounted on a conveyor frame which extends rearwardly from the cutting head 104. One or more transport conveyors can be mounted in the conveyor frame to carry cut sod slabs rearwardly and upwardly from the undercutting knife. In the illustrated example, a transport conveyor 112 is positioned to downstream from the cutting head 104 to receive the cut sod strips and convey them away from the cutting head 104.

Optionally, a sod roll-up mechanism 114 is provided to roll the sod strips into sod rolls. After being formed into sod rolls 116, the rolls of sod are transferred to an accumulator 118 disposed downstream from the transport conveyor. Alternatively, instead of being rolled into sod rolls, in some embodiments, the cut pieces can be collected on the accumulator as generally flat slabs of sod.

Optionally, the accumulator 118 may include one or more a storage conveyor belts having an upward facing receiving 120 surface upon which sod rolls can be deposited in a group for subsequent processing, including, for example, transfer to a pallet 122 (FIG. 2) via a sod handling apparatus. Alternatively, the accumulator need not include conveyors, and may be any suitable area or apparatus that is capable of receiving pieces of sod from the transport conveyor 114 and holding or storing the sod, at least temporarily, until the sod pieces are moved for further processing or stacking.

In the illustrated example the sod harvester also includes a pick-up and transfer mechanism 124 for picking up sod rolls from the accumulator, moving them over to a pallet and depositing them onto the pallet (or any other suitable sod storage apparatus, including, for example, a crate, the bed of a vehicle and optionally placing the sod directly on the ground). The sod pick-up and transfer mechanism can include a sod handling apparatus 150, for engaging and picking-up sod rolls 116, and any suitable gantry mechanism 126 for supporting the sod handling apparatus and moving the sod handling apparatus between the accumulator 118 (to pick-up sod rolls) and the pallet 122 (to deposit the sod rolls on the pallet).

The sod handling apparatus 150 may be operable to pick-up one or more sod rolls simultaneously, and optionally may be configured to pick-up 5 sod rolls simultaneously.

The gantry mechanism 126 may be any suitable apparatus that is capable of maneuvering and sod handling apparatus, and any engaged sod rolls, between the accumulator and the pallet. Optionally, the gantry mechanism may include linear rails, linkages, one or more a manipulator arm, one or more robotic arm (with any desired number of degrees of freedom), combinations thereof, or any other suitable apparatus. One suitable example of a gantry mechanism is a robotic arm as described in U.S. Pat. No. 7,070,004, the contents of which are incorporated herein by reference. Preferably, the sod handling apparatus is rotatably coupled to the gantry mechanism 126 so that the head 152 can be rotated with respect to the accumulator where sod rolls are picked up, and with respect to the pallet onto which the sod rolls are stacked. This rotation, in combination with the features of the sod handling apparatuses described herein can help facilitate a variety of stacking patterns and methods. Optionally, the head 152 is rotatable about a generally vertical axis, when the machine is in use that is substantially orthogonal to the head axis 160 (i.e. so that the head axis 160 is generally horizontal while the machine is in use).

Figure 2:
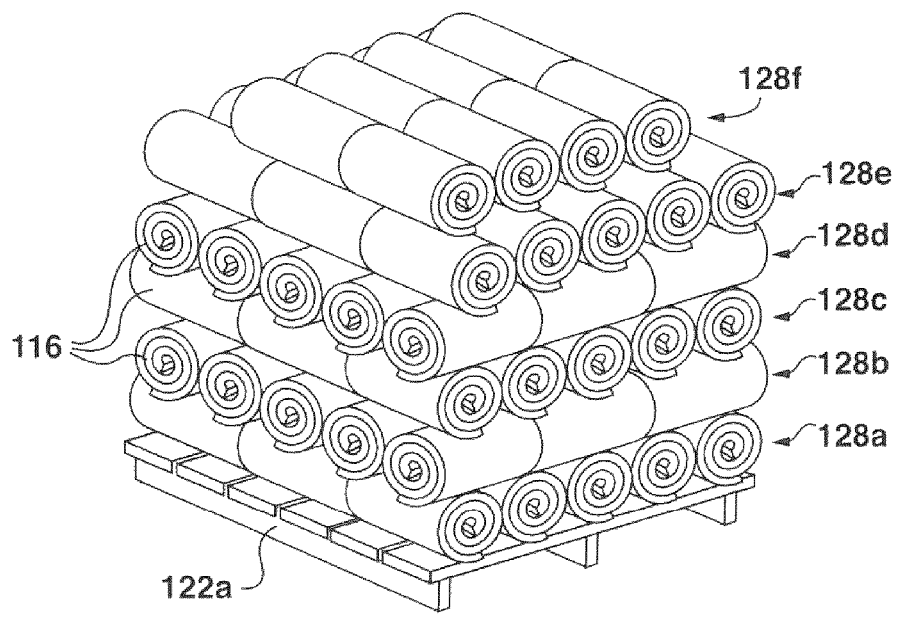
FIG. 2 is a perspective view of sod rolls stacked on a first type of pallet.

Some sod harvesters are configured to stack the pieces of sod (either rolls or slabs) onto standard North American pallets which are approximately 48"×48". When producing sod rolls, harvesters can be configured to form sod rolls having lengths of either 16" or 24", which can fit evenly within the 48"×48" boundaries of the North American pallet. Referring to FIG. 2, an example of sod rolls 116 stacked on a pallet 122a is illustrated. In this example, for a typical sod roll having a diameter of about 9", the sod can be stacked by placing three 16" rolls, or two 24" rolls of sod end to end with each other and then repeating this stacking to form 5 rows of sod across, to provide a layer 128 of sod that is approximately 48"×45" (if the rows are tightly fit together). Optionally, the sod rolls forming the bottom three layers 128a-c on a given pallet 122 can be slightly spaced apart from each other to provide 48"×48" layers. This may help provide relatively large layers toward the base of the stack of sod, which may help stabilize the stack.

When stacking successive layers 128 on top of each other, each layer can be rotated approximately 90 degrees relative to the previous layer, which can help stabilize the stacked sod.

The upper layers 128d-f in the stack may be spaced together more tightly i.e. to form 48"×45" layers, which makes them slightly smaller than the underlying, loosely spaced layers 128a-c, and may help stabilize the stacked sod. Optionally, the number of rows of sod in the upper layers may be reduced so that the resulting stack of sod has a generally pyramid-type shape, which may help stabilize the stacked sod.

Alternatively, instead of using a 48"×48" North American pallet 122a, some sod farmers may wish to use a Commonwealth Handling Equipment Pallet (CHEP). A common size of CHEP is the CHEP B1210A pallet, which has a length 132 of 1200 mm (approximately 47.24 inches) and a width 134 of 1000 mm (approximately 39.37 inches). When using a CHEP1210A pallet it may be desirable to use a different sod roll stacking pattern than is used with the North American pallet.

For example, while the length 132 (i.e. 47.24 inches) may be close enough to the 48 inch dimension of the North American pallet for most practical purposes, the length 134 (i.e. 39.37 inches) may not accommodate sod rolls if stacked in the arrangement illustrated in FIG. 2.

Figure 3:
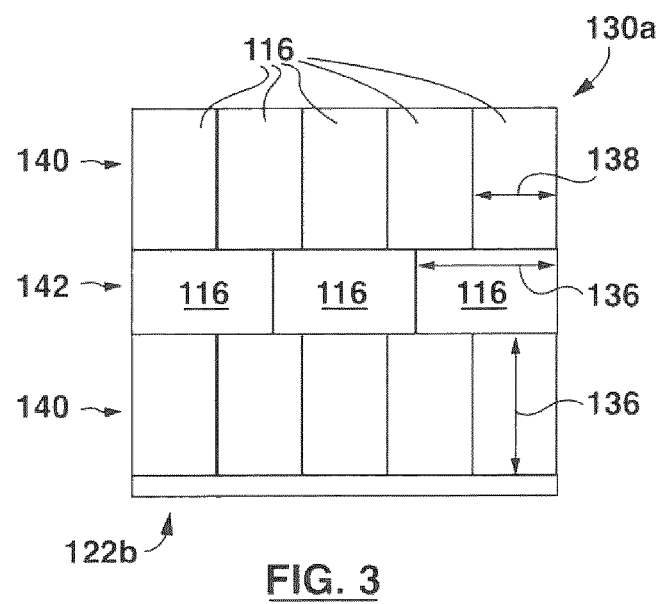
FIG. 3 is a top view of one layer of sod rolls stacked on a second type of pallet.
Figure 4:
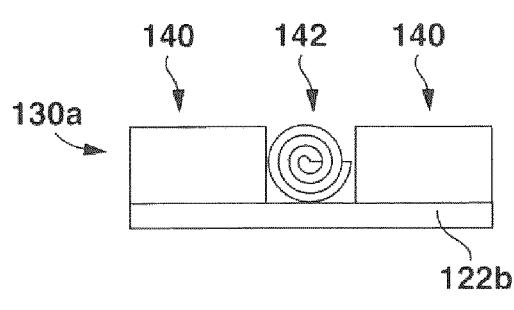
FIG. 4 is a side view of the stacked sod rolls of FIG. 3.

An alternative stacking pattern for the first layer sod rolls on a CHEP1210A pallet is illustrated in FIGS. 3 and 4. In the illustrated example, the sod rolls 116 have a length 136 of about 16 inches, and are rolled to have a diameter/width 138 of about 9 inches. In this pattern, two outside rows 140 of five sod rolls are provided, with a single, central row 142 of three sod rolls oriented orthogonally to the outer rows 140 positioned between them. To stack sod rolls 116 in this pattern it can be useful to have a sod handling apparatus that is capable of carrying and depositing five sod rolls simultaneously (i.e. for the outer rows 140), while also having the ability to place sod rolls individually, and at a different orientation, to provide the central row 142. Due to the geometry of the CHEP1210A pallet, this same pattern may not be desirable to use in the next layer of sod, as it will not generally fit within the pallet dimensions if rotated 90 degrees.

Figure 5:
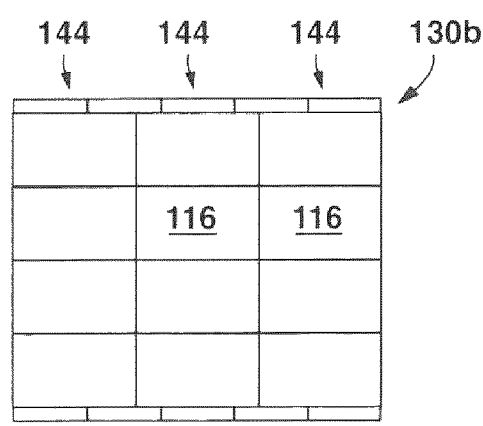
FIG. 5 is a top of another layer of sod rolls stacked on top of the layer of FIG. 3.
Figure 6:
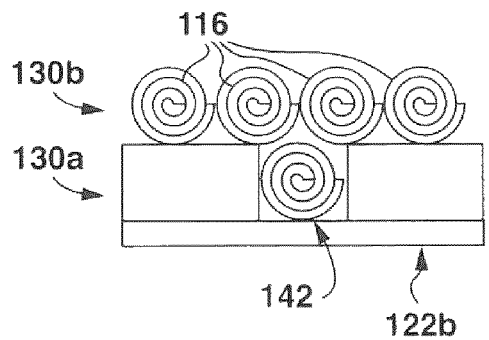
FIG. 6 is a side view of the layer of sod rolls of FIG. 5.
Figure 7:
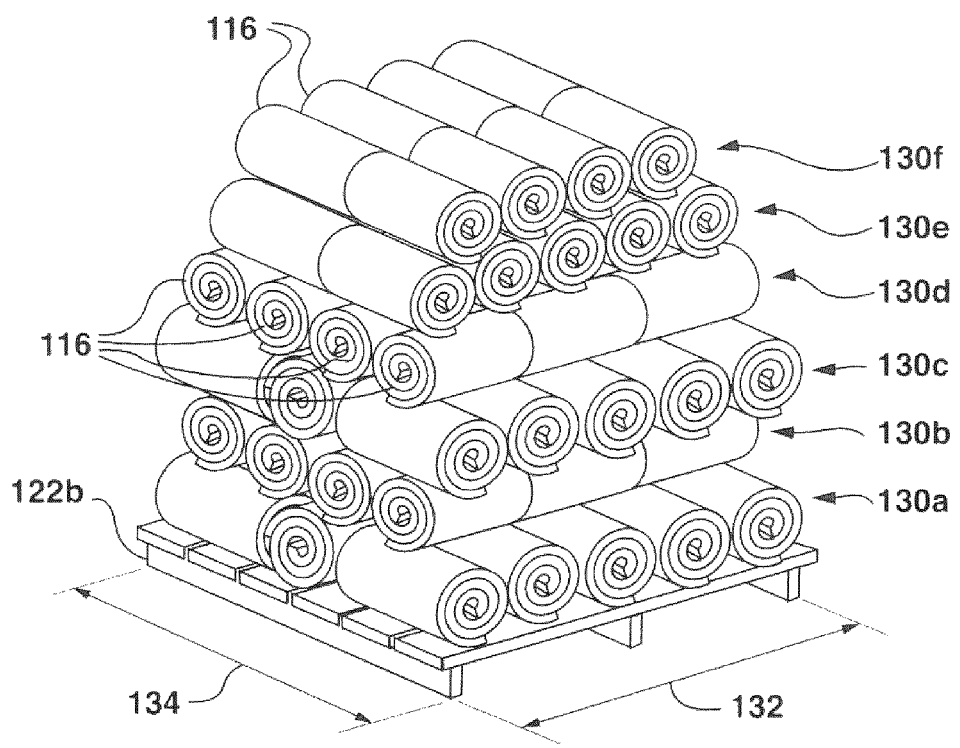
FIG. 7 is a perspective view of sod rolls stacked on a second type of pallet.

Referring to FIGS. 5 and 6, the next layer can include 12 tightly spaced sod rolls, arranged in three rows 144 of four sod rolls each. To stack sod rolls 116 in this pattern it can be useful to have a sod handling apparatus that is capable of carrying and depositing 4 sod rolls simultaneously, in the desired spacing, to form each of the three rows 144.

Sod rolls 116 can continue to be stacked on the pallet 122*b* by arranging the sod layers 130*a* and 130*b* illustrated in FIGS. 3 and 4, and 5 and 6, in an alternating arrangement. (i.e. one layer 130*a* of 13 sod rolls, one layer 130*b* of 12 sod rolls, one layer of 13 sod rolls, etc.).

One known example of the sod handling apparatus that may be used to stack sod rolls in this manner is described in U.S. Pat. No. 7,096,967. This sod handling apparatus includes a head with has 5 sod carriers. One of the sod carriers that is provided toward one end of the head can be operated independently of the other 4 sod carriers. This can allow the two outer rows to be formed by utilizing all 5 sod carriers, and then using the one independently operable sod carrier to drop individual rolls of sod between the rows to provide the central row. The remaining 4 sod rolls can be held in their sod carriers after the single sod roll is dropped, and then used to form one of the rows of 4 sod rolls on the next layer (i.e. the layer 130*b* of 12 sod rolls of FIGS. 5 and 6). This sequence can be repeated to complete the stack of sod. However, using the known sod handling apparatus, the head moves a considerable distance between depositing the first individual sod roll and depositing the remaining 4 sod rolls on the next layer. This can increase the amount of time required to stack the sod rolls, which in turn may reduce the overall speed at which the sod harvester can be operated without the sod rolls backing up on the accumulator. Additionally, to place the first, single roll between the two outer rows of 5 sod rolls the head is positioned so that one end of the head is registered above the centre of the pallet. In this configuration, portions of the head may extend laterally beyond the perimeter of the pallet. This can increase the amount of clearance space required around the perimeter of the pallet to accommodate the sod handling apparatus. This may inhibit the positioning of walls, safety barriers, stacking guides and/or other pieces of equipment in close proximity to the perimeter of the pallet.

Referring to FIGS. 28-32, an example of a pattern for stacking the longer, 24" sod rolls on a CHEP1210A pallet is illustrated. In this embodiment, the pallet is a rectangular pallet. The pallet has opposing first 300 and second edges 302 that are spaced apart from each other in a first direction by the pallet length 132, and opposing third 304 and fourth edges 306 that extend between the first and second edges are spaced apart from each other in a second direction that is orthogonal to the first direction by the pallet width 134.

In this pattern, a first layer 308*a* includes nine sod rolls 116, each of which has a length 136, a width 138 and a roll axis 174 (about which the rolls are formed). In this example, the sod rolls 116 have generally similar dimensions. In particular, each roll preferably has a length 136 of about 24" and a diameter of about 8" (which will also be referred to as the width of the sod roll). In the illustrated example, when the rolls are carried using the head 152, the roll axes 174 are generally horizontal and are substantially transverse to the head axis 160, and the head 152 can be pivoted about its vertical axis (the connection point to the gantry mechanism) to adjust the orientation of the sod rolls 116 relative to the pallet.

Figure 28:
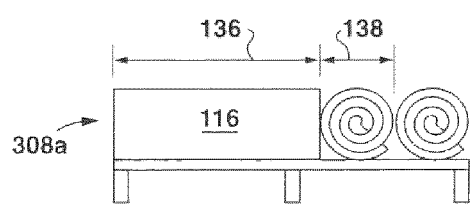
FIG. 28 is side view of one layer of sod rolls stacked on a pallet.
Figure 29:
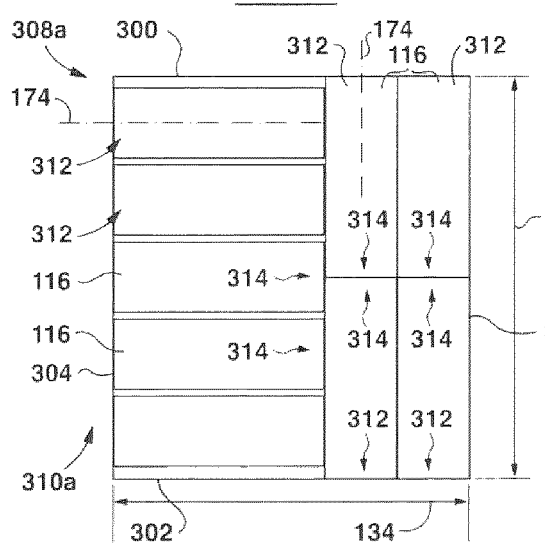
FIG. 29 is a top view of the layer of sod rolls of FIG. 28.

Referring to FIGS. 28 and 29, to form the first layer 308*a* in the illustrated example, five of the sod rolls 116 are oriented so that their respective roll axes 174 are generally parallel to each other and extend in the second direction (i.e. from left to right as illustrated). The five sod rolls are also grouped closely together (and optionally are in direct contact with each other) to form a row of sod 310*a* that extends along the third edge 304 of the pallet. In this position, an outer end 312 of each of the sod rolls 116 is adjacent the third edge 304 of the pallet, and the opposing end 314 of each sod roll 116 in the row 310*a* is located in the interior of the pallet. In this example, the length 136 of the sod rolls is more than 50% of the pallet width 134. In this configuration, the space left between the first row 310*a* and the fourth edge 306 of the pallet is not wide enough to accommodate another row of sod rolls having the same orientation as the first row 310*a*. Placing more 24" sod rolls that are parallel to the rolls 116 in the first row would require at least some of portion of the sod rolls to extend beyond the perimeter of the pallet, which may be undesirable in some instances.

Consequently, the first layer 308*a* also includes four sod rolls 116 that are arranged in pairs to help fill the space between the first row 310*a* and the fourth edge 306 of the pallet. In this configuration, these four sod rolls 116 are oriented so that they are generally orthogonal to the sod rolls 116 in the first row 310*a*, and their roll axes 174 are generally orthogonal to the axes 174 of the rolls 116 in the first row 310*a*.

Referring to FIG. 29, in the illustrated example, the first pair of sod rolls 116 (toward the top as illustrated) is arranged so that each sod roll has an end 312 that is adjacent the first edge 300 of the pallet and an opposed end 314 that is positioned in the interior of the pallet. One of the sod rolls 116 (on the left as illustrated in FIG. 29) is adjacent the inner ends 134 of at least two of the sod rolls 116 in the first row 310*a* (it covers two and a half of the rolls—i.e. about half the length of the first row 310*a*) in the example illustrated), and the other of the rolls (on the right as illustrated in FIG. 29) extends along the fourth edge 306 of the pallet. The second pair of sod rolls 116 (the lower pair as illustrated in FIG. 29), is similarly positioned. Each roll 116 in the lower pair is aligned with a corresponding roll in the upper pair, and the inner ends 134 of the rolls in the lower pair are adjacent the inner ends 134 of the rolls in the upper pair.

Figure 30:
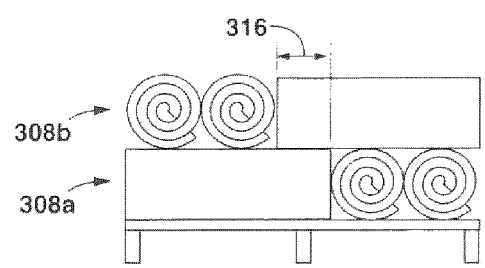
FIG. 30 is a side view of the layer of sod rolls of FIG. 28 with another layer of sod rolls on top of it.
Figure 31:
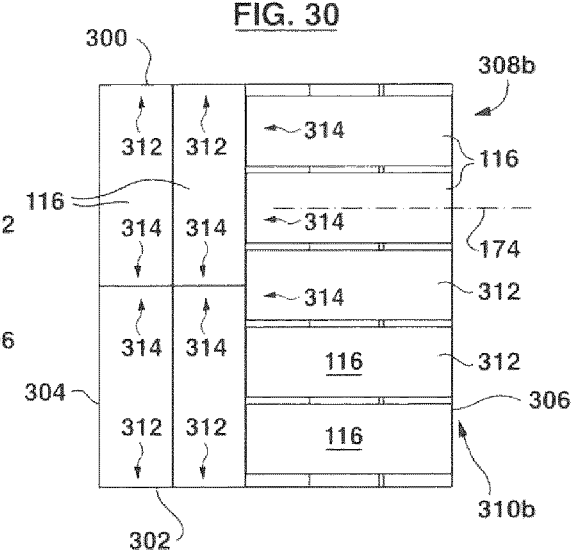
FIG. 31 is a top view of the layer of sod rolls of FIG. 30.

Referring now to FIGS. 30 and 31, a second layer 308*b* can be stacked on top of the first sod layer 308*a*. Optionally, the second layer 308*b* can have the same general configuration as the first layer 308*a*, and may include a second row of sod 310*b* (containing five sod rolls) and four additional sod rolls 116 arranged in pairs between the row 310*b* and the opposing edge of the pallet.

The second sod layer 308*b* can be configured to have the same orientation as the first sod layer (i.e. the second row 310*b* completely overlies the first row 310*a*), or may be rotated (relative to the first sod layer 308*a*) by any suitable angle, including, for example by about 90 degrees, 180 degrees, 270 degrees or any position in between. If the second layer 308b is rotated 90 degrees relative to the first layer 308a, portions of the second layer 308b may extend beyond the perimeter of the pallet. This may be acceptable in some instances, but may be undesirable when using certain types of automated harvesting equipment. Rotating the second layer 308b either 0 or 180 degrees relative to the first layer 308a may help keep the second layer 308b within the perimeter of the pallet.

Preferably, as illustrated in FIG. 31, the second layer 308b can be rotated 180 degrees relative to the first layer 308a. In this configuration, the second row 310b is offset from the first row 310a (i.e. the first row is adjacent the third edge 304 of the pallet—FIG. 29 and the second row 310b is toward the fourth edge 306 of the pallet—FIG. 31), such that the second row 310b covers the two pairs of sod rolls in the first layer and also partially overlaps the inner ends 314 of the sod rolls 116 in the first row 310a by a row overlap distance 316 (FIG. 30). Optionally, the overlap distance 316 can be modified (by changing when some of the sod rolls are placed) and may be selected so that it is between about 10% and about 30% of the length 136 of the sod rolls 116. Arranging the layers 308a and 308b in an alternating manner, and providing at least a partial overlap between the rows 310a and 310b may help increase the stability of the sod stacked on the pallet in this pattern.

Figure 32:
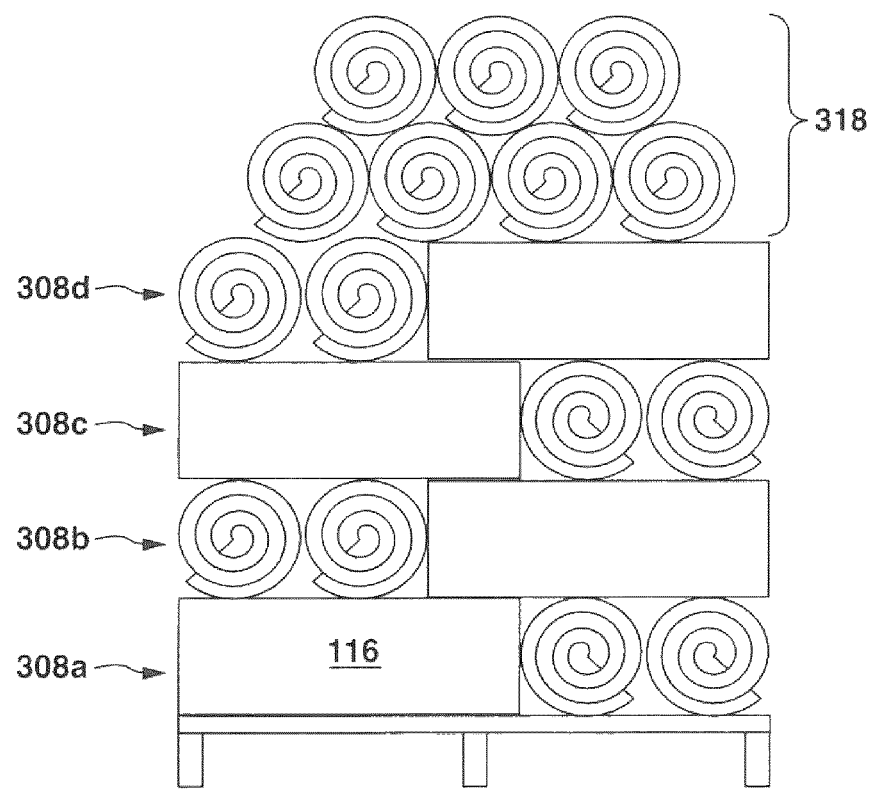
FIG. 32 is a side view of the layers of FIG. 30 and additional sod rolls stacked on a pallet.
Figure 33:
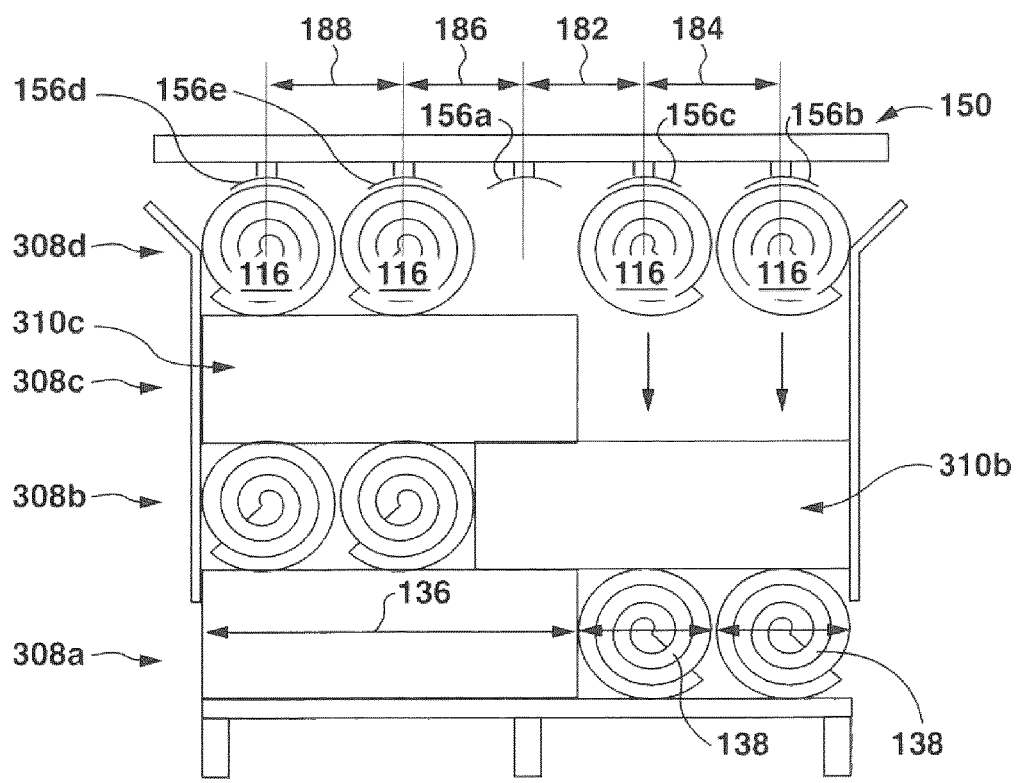
FIG. 33 is a side view illustrating the stacking of some of the layers of sod in FIG. 32.

Referring to FIG. 32, subsequent layers of sod 308c and 308d may have the same configuration as layers 308a and 308b, and may be arranged in an alternating fashion as shown. While FIG. 32 shows four similar layers 308a-308d, in other examples a pallet may carry fewer than four or more than four layers 308. Optionally, the spacing between adjacent sod rolls 116 in the layers may be modified, such that, for example, while having the same general configuration the sod rolls in the first layer 308a may be further spaced apart from each other than the sod rolls in the third layer 308c. Adjusting the roll spacing so that the upper layers (for example 308c and 308d) are more tightly packed than the lower layers (308a and 308b) may help improve the stability of the stack. Each of the layers 308 may be stacked in the same manner and using the same sod handling equipment. Alternatively, the stacking method may vary for each layer.

Figure 39:
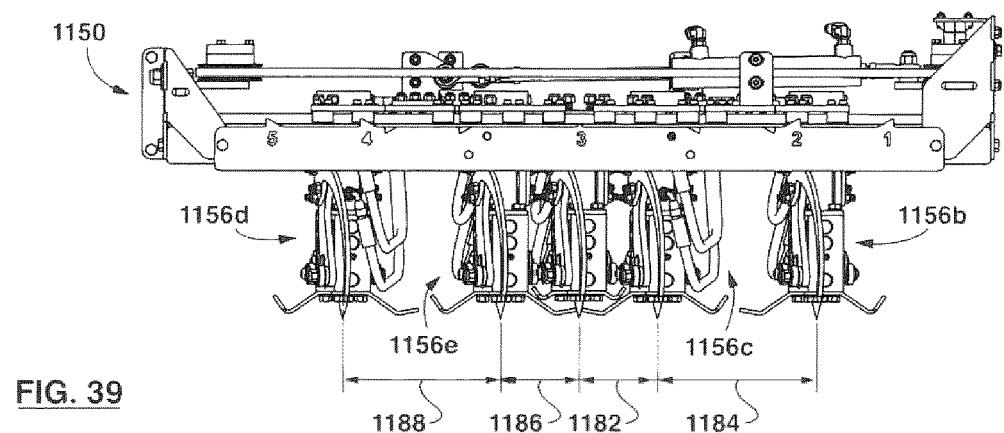
FIG. 39 is a front view of the sod handling apparatus of FIG. 37.

Continuing to refer to FIG. 39, a cap or crown 318 may be provided toward the top of the stack. The cap 318 may have a different stacking pattern than the underlying layers 308a-308d, and may include a different number of sod rolls per layer.

Optionally, the sod rolls 116 in the first layer 308a (or any of the layers 308) may be stacked in any order, and using any suitable stacking mechanism. Optionally, the sod rolls 116 may be stacked using the sod handling apparatuses described herein, or other such mechanisms. Optionally, for example If the sod rolls 116 are stacked using the sod handling apparatus 150, the five sod rolls in the first row 310a may be picked-up together from an accumulator on a sod harvesting machine, moved to the pallet together and deposited together on the pallet. In this configuration, the first row 310a can be placed in a single step, and without requiring the sod handing apparatus to make more than one trip between the pallet and the sod accumulator. To place the remaining four sod rolls in the layer, the sod handling apparatus 150 may pick-up four sod rolls from the accumulator, move to a first location on the pallet, deposit a first pair of the sod rolls, move to another location on the pallet (without having to return to the accumulator) and then place the second pair of sod rolls. In this example, the entire first layer 308a could be formed while making only two trips between the accumulator and the pallet. Alternatively, the sod rolls may be picked-up and transferred between the accumulator and the pallet in other groupings, including, for example each sod roll be transferred individually (i.e. 9 trips between the accumulator and the pallet), and other suitable groupings and other examples of stacking methods described herein.

Figure 8:
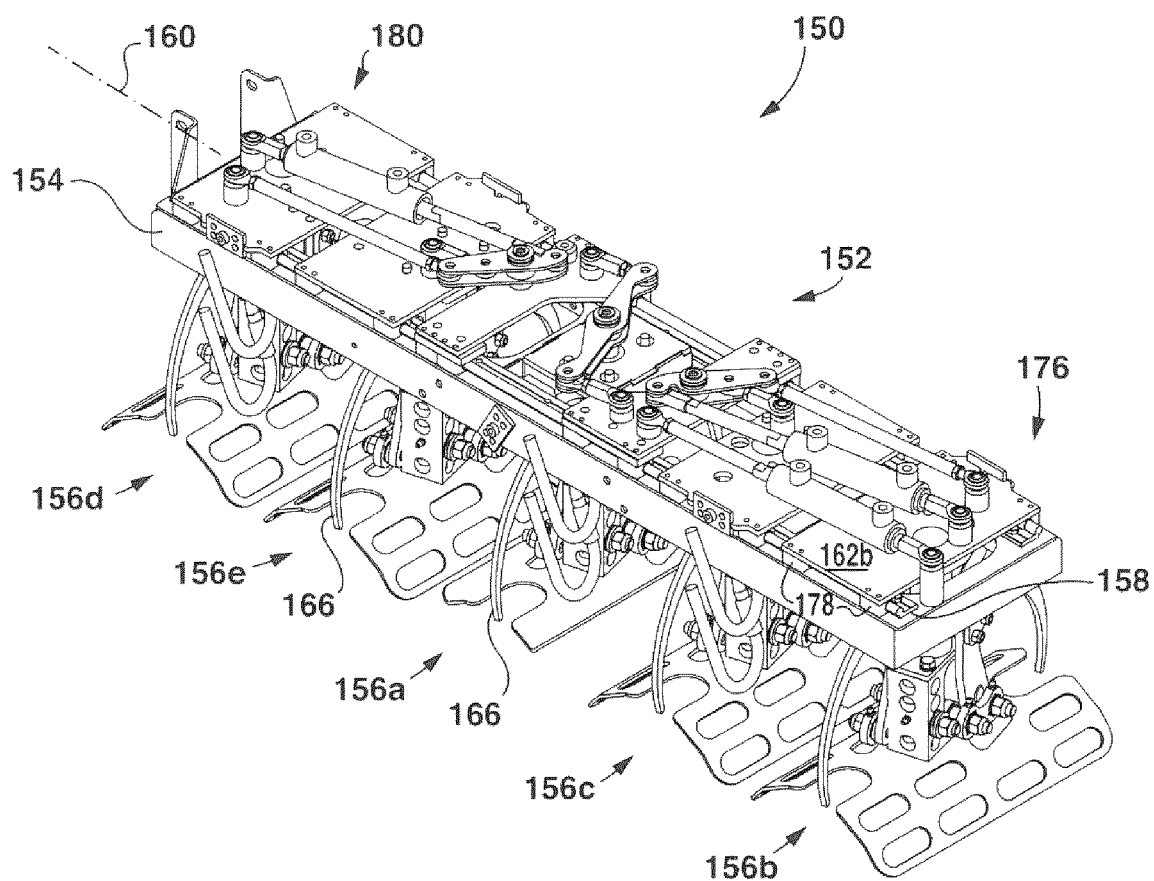
FIG. 8 is a perspective view of an example of a sod handling apparatus in an expanded configuration.

Referring now to FIG. 8, one example of a new sod handling apparatus 150 that can be connected to the gantry apparatus 126 of the sod harvester 100 is illustrated. The sod handling apparatus may be suitable for use stacking sod rolls 116 in a first pattern (e.g. that is suitable for use on North American 48"×48" pallets as illustrated in FIG. 2) and may be adjustable and/or reconfigurable to help facilitate stacking the sod rolls in another pattern, or patterns (e.g. that is suitable for the alternating layer stacking pattern on a CHEP-style pallet as illustrated in FIGS. 3-7 and/or FIGS. 28-33).

In the illustrated example, the sod handling apparatus 150 includes a head 152 extending in a first direction along a head axis 160 and having a frame 154 that supports five sod carriers 156a-e, each of which is capable of picking up at least one sod roll 116 (or alternatively may be configured to pick up a sod slab). While in the illustrated example, the sod handling apparatus 150 is configured to engage and carry up to 5 sod rolls simultaneously, in other embodiments may be configured to engage a different number of sod rolls, including, for example three sod rolls (optionally a head including only sod carriers 156a, 156c and 156e as illustrated), or more than five sod rolls.

Optionally, the sod handling apparatus 150 can be configured so that one of the sod carriers 156 is fixedly connected to the head 152, and one or more of the other sod carriers 156 is movably mounted to the head 152. This may enable some of the sod carriers to be moved relative to other ones of the sod carriers. Moving some of the sod carriers may allow the sod handling apparatus to alter the spacing between adjacent sod carriers, and therefore alter the spacing between the rolls of sod carried in the sod carriers. This may allow the sod rolls to be dropped on the pallet, such as pallet 122b, in a variety of different configurations and/or relative spacings. Optionally, the fixed sod carrier may be positioned generally toward the middle of the head. In this configuration, when the fixed sod carrier is positioned above a central portion of the pallet the sod handling apparatus may be generally centred relative to the pallet. Optionally, the sod handling apparatus 150 may be sized so that when a centrally located fixed sod carrier is positioned above the centre of the pallet all, or substantially all of the sod handling apparatus may be located within the perimeter of the pallet. This may help reduce the risk of interference between the head 152 and guards or other structures surrounding the pallet 122.

Optionally, if the sod handling apparatus 150 includes at least one fixed sod carrier disposed toward the centre of the head 152, one or more moveable sod carriers may be positioned on either side of the fixed sod carrier, and may be translatable inwardly (toward the first sod carrier) and outwardly (away from the first sod carrier).

Optionally, in combination with the movable sod carriers, or as a separate aspect of the teachings herein, the sod carriers may all be operable in unison with each other, may all be operable independently of each other, or a combination thereof. For example, the sod handling apparatus may be configured so that one sod carrier is operable independently of the others, while the remaining sod carriers operate in unison. This may help facilitate stacking of one sod roll independently of the other remaining sod rolls, which may then be deposited as a group/set.

Referring again to FIG. 8, in the illustrated example the frame 154 includes two side rails 158. The side rails 158 are generally parallel to each other and extend generally parallel to a head axis 160. The head 152 can be coupled to any suitable gantry mechanism 126, using any suitable coupling apparatus.

Figure 9:
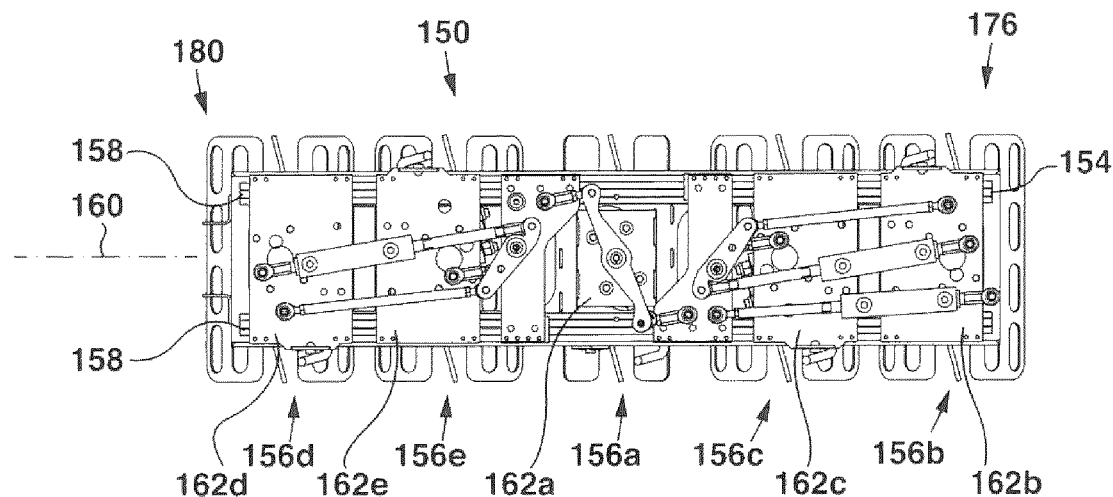
FIG. 9 is a top view of the sod handling apparatus of FIG. 8.
Figure 10:
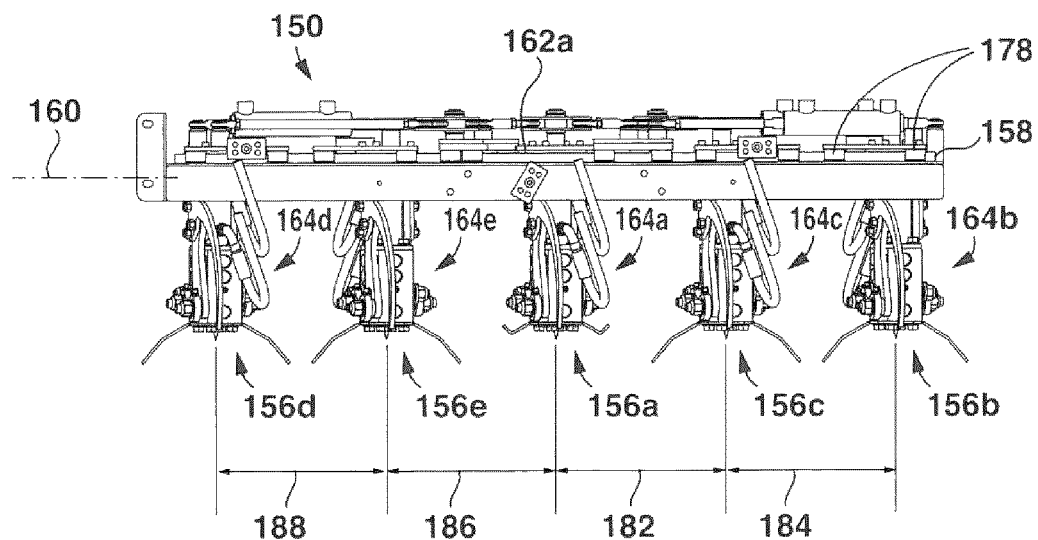
FIG. 10 is a front view of the sod handling apparatus of FIG. 8.

In the illustrated example, sod handling apparatus 150 includes a first sod carrier 156a that is mounted in the centre of the head 152. Optionally, the first sod carrier 156a can be fixedly coupled to the head 152 so that the first sod carrier 156a does not translate relative to the frame 154. Referring also to FIGS. 9 and 10, the first sod carrier 156a includes a base plate 162a that is fixedly coupled to the frame, and a gripper portion 164a extending from the base plate 162a, suspended beneath the frame 154.

Figure 20:
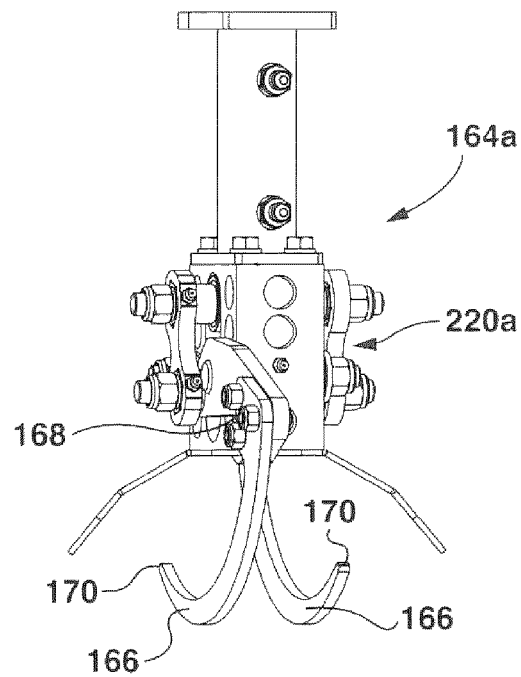
FIG. 20 is a perspective view of a portion of the sod handling apparatus of FIG. 8.

The gripper portion can be any suitable apparatus that is operable to pick-up and release a sod roll. In the illustrated example, the gripper portion 164a includes piercing members in the form of tines 166. Referring also to FIG. 20, each tine 166 is elongate and has a root 168 that is pivotally coupled to the gripper portion 164a, and a tip 170 that is spaced apart from the root 168. In the illustrated example the tines 166 are curved into hook-like members, but may have any suitable configuration, including, for example straight, bent, angled and other arrangements.

Each tine 166 is movable between a retracted position (shown in FIG. 8) and an engaged position (shown in FIG. 20). In the engaged position, the tip 170 pierces an outer surface 172 (FIG. 21) of a sod roll 116 to engage the sod roll 116. In the illustrated example, the tines 166 are arranged generally axially such that when moving between the retracted position and the advanced position, the tines 166 move, and travel through the sod roll 116 in a generally longitudinal direction. Aligning the tines 166 axially may help increase the length of sod roll 116 that is engaged by the tines 166, which may help retain the sod roll 166. In the illustrated example the tines 166 are connected so that they move in unison with each other, but alternatively may be independently controllable. This may also help reduce the lateral extension of the tines, particularly when in the retracted position, which may help reduce the overall width of the sod carriers 156. Providing relatively narrow sod carriers 156a-e (for example, sod carriers in which the width 236a is less than the sod roll diameter 136) may help facilitate positioning at least some of the sod carriers (such as sod carriers 156c and 156e), and any sod rolls 116 they are carrying, closely together.

The other sod carriers 156b-e on the sod handling apparatus 150 are generally similar to the first sod carrier 156a, and include generally identical gripper portions 164b-d. However, unlike the first sod carrier 156a, the other sod carriers 156b-e are movably attached to the head 152 and can translate axially toward and away from the first sod carrier 156a, and each other.

For example, referring to FIG. 8, the sod handling apparatus 150 includes a second sod carrier 156b that is attached at a first end 176 of the frame 154. Referring also to FIG. 9, the second sod carrier 156b includes a respective base plate 162b that is slidably mounted to the rails 158, using sliders 178, so that the second sod carrier 156b can translate axially along the rails 158. In this configuration, the axial spacing between the first sod carrier 156a and the second sod carrier 156b can be adjusted by translating the second sod carrier 156b toward or away from the first sod carrier 156a. The second sod carrier 156b includes a gripper portion 164b that is generally identical to the gripper portion 164a on the first sod carrier 156a.

A third sod carrier 156c, which is generally identical to the second sod carrier 156b, is mounted to the head 152 and is positioned between the first sod carrier 156a and the second sod carrier 156b. The third sod carrier 156c includes a base plate 162c that is slidably mounted to the rails 158, and can translate axially relative to the first sod carrier 156a and the second sod carrier 156b. A gripper portion 164c is suspended from the third base plate 162c. The second sod carrier 156b and third sod carrier 156c are both positioned on the same side of the first sod carrier 156a (to the right as illustrated in FIGS. 8-10).

A fourth sod carrier 156d, which is generally identical to the second sod carrier 156b, is mounted to the head 152 toward the second end 180 of the head. The fourth sod carrier 156d includes a base plate 162d (FIG. 9) that is slidably coupled to the rails 158, and a gripper portion 164d (FIG. 10). A fifth sod carrier 156e, that is generally identical to the third sod carrier 156c, is mounted to the head 152 between the fourth sod carrier 156d and the first sod carrier 156a. The fifth sod carrier 156e includes a base plate 162e that is slidably coupled to the rails 158, and a gripper portion 164e.

Optionally, the second, third, fourth and fifth sod carriers 156b-e can be movable independently of each other, movable in unison with each other, or a combination thereof. For example, movements of the second and third sod carriers 156b and 156c (and optionally any other sod carriers provided on the same side of the first sod carrier 156a) may be coordinated with each other, and movements of the fourth and fifth sod carriers 156d and 156e (and any other sod carriers on that side of the first sod carrier 156a) may be coordinated with each other, and may or may not be coordinated with the movements of the second and third sod carriers 156b and 156c. Alternatively, or in addition, the carriers 156b-e can be connected in mirrored pairs that move together, such that carriers 156b and 156d move in unison with each other toward and away from the sod carrier 156a (i.e. both move inwardly at the same time or outwardly at the same time), and similarly carriers 156c and 156e move in unison with each other and optionally independently of carriers 156b and 156d.

Figure 16:
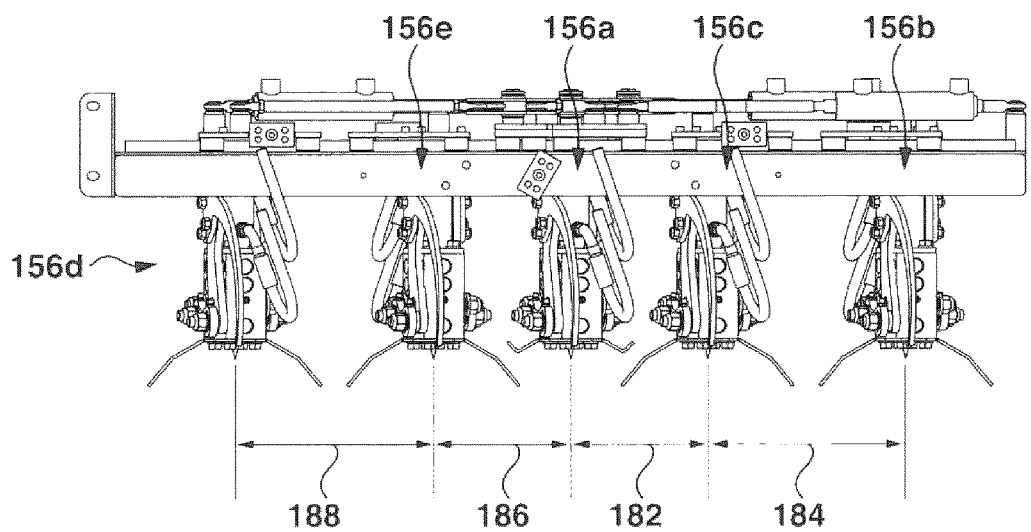
FIG. 16 is a front view of the sod handling apparatus in the position of FIG. 14.
Figure 17:
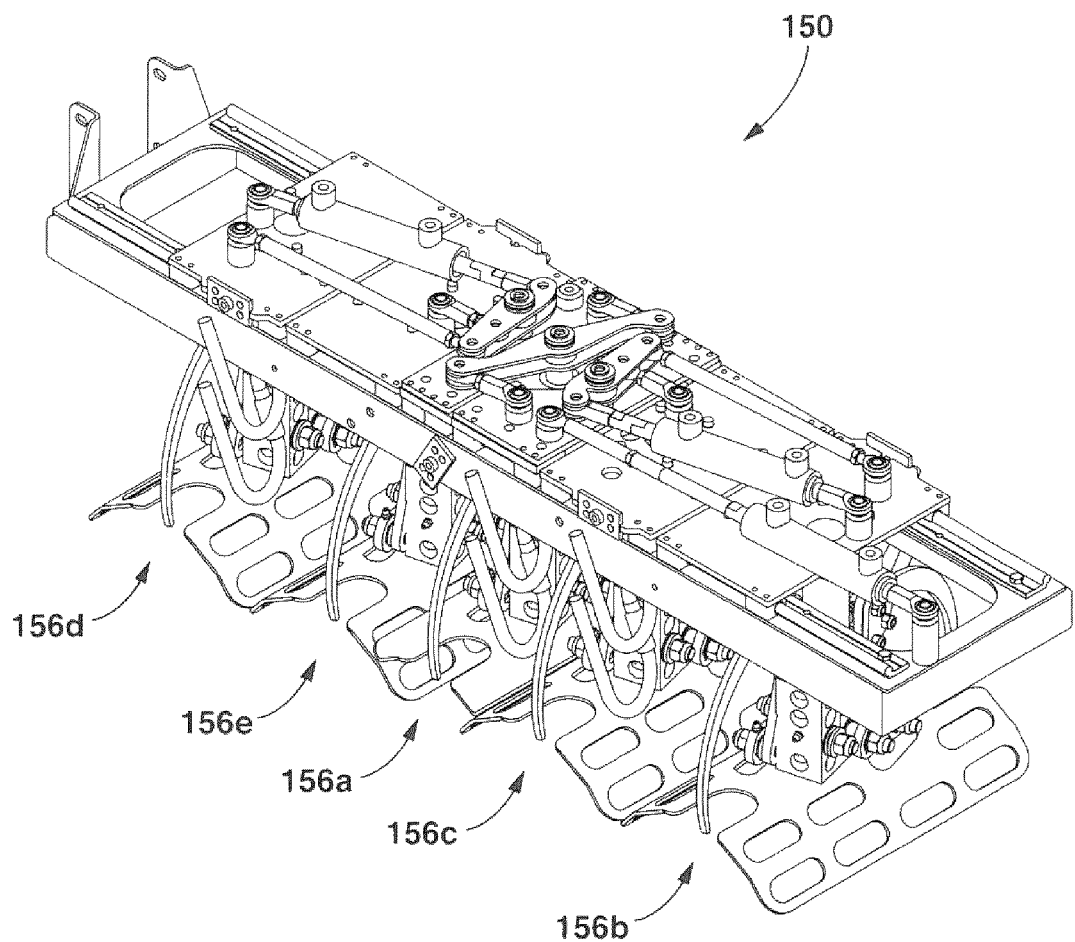
FIG. 17 is a perspective view of the sod handling apparatus of FIG. 8 in yet another contracted configuration.
Figure 18:
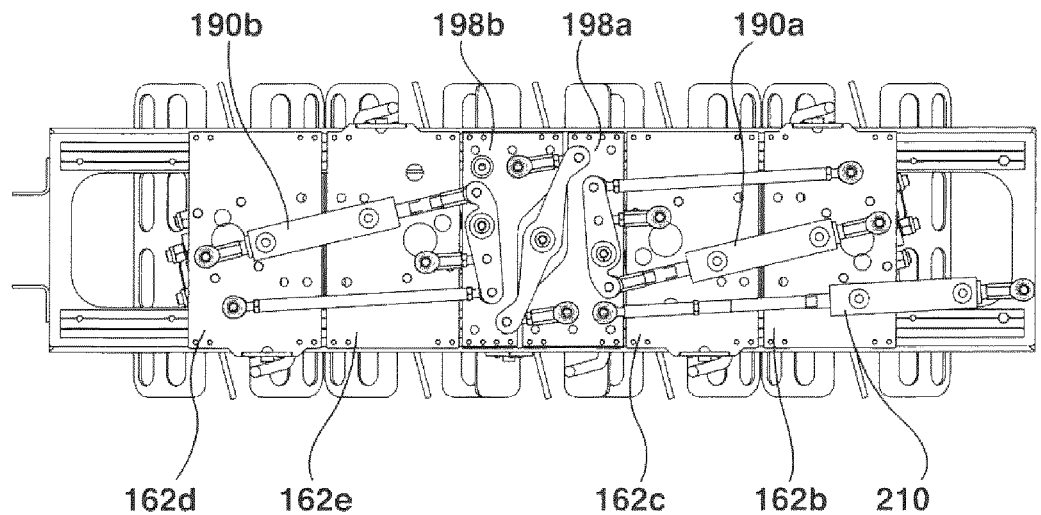
FIG. 18 is a top view of the sod handling apparatus of FIG. 17.
Figure 19:
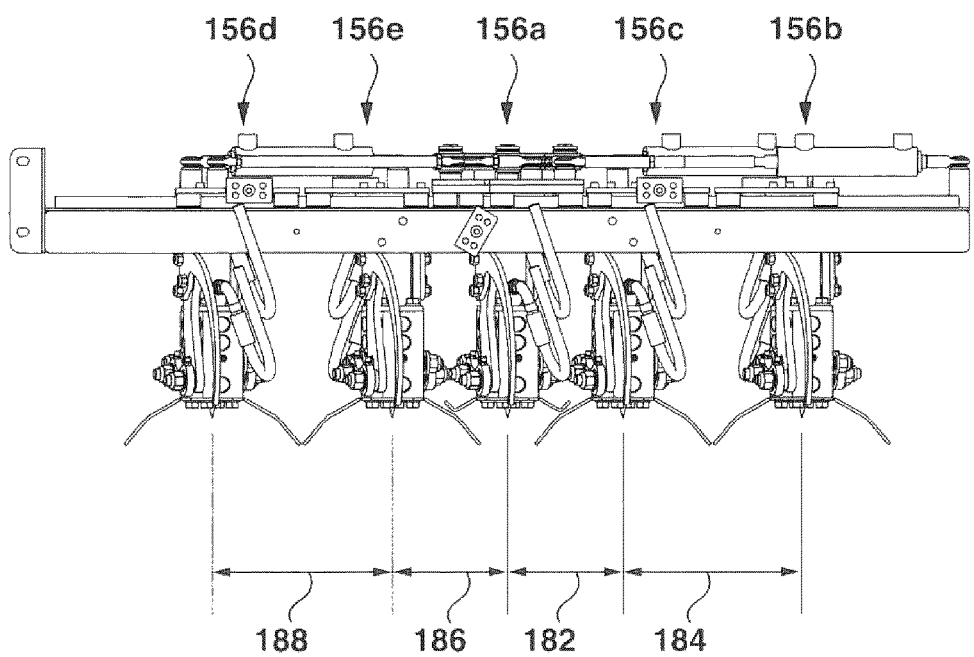
FIG. 19 is a front view of the sod handling apparatus of FIG. 17.

In the illustrated example, the sod handling apparatus 150 is configured so that it is adjustable, by changing the relative positions of the second, third, fourth and fifth sod carriers 156b-e, into an extended configuration (FIGS. 8-10), a first contracted configuration (FIGS. 11-13), a second contracted configuration (FIGS. 14-16) and optionally may also be adjustable into a third contracted configuration (FIG. 17-19).

Referring to FIG. 10, when the sod handling apparatus 150 is in the extended configuration the sod carrier heads 156a-e are generally equally spaced apart from each other in the first direction (parallel to the axis 160, FIG. 8). In this configuration, the third sod carrier 156c is spaced apart from the first sod carrier 156a by an offset distance 182 and the second sod carrier 156b is spaced apart from the third sod carrier 156c by an offset distance 184. Similarly, the fifth sod carrier 156e is spaced apart from the first sod carrier 156a by an offset distance 186, and the fourth sod carrier 156d is offset from the fifth sod carrier 156e by an offset distance 188. In this configuration, the head 152 can be used to pick-up sod rolls that are generally equally spaced apart, and/or to deposit the sod rolls on a pallet 122 in a generally equally spaced arrangement. The offset distances 182, 184, 186 and 188 may be any suitable length, and may be, for example, between about 5 inches and about 15 inches or more, and may be between about 7 inches and about 10 inches or between about 9.5 and 9.75 inches, and may be between about 15% and about 150% or more of the diameter of the sod rolls being handled. In the illustrated example, the offset distances 182, 184, 186 and 188 are each approximately 9.6 inches. This spacing may help facilitate the pick-up of standard, 9 inch-diameter sod rolls 116 with each sod carrier 156*a-e*.

While illustrated as being equally spaced apart in FIG. 10, in other embodiments when the sod handling apparatus 150 is in an expanded configuration the sod carriers 156*a-e* need not be equally spaced apart from each other.

Figure 11:
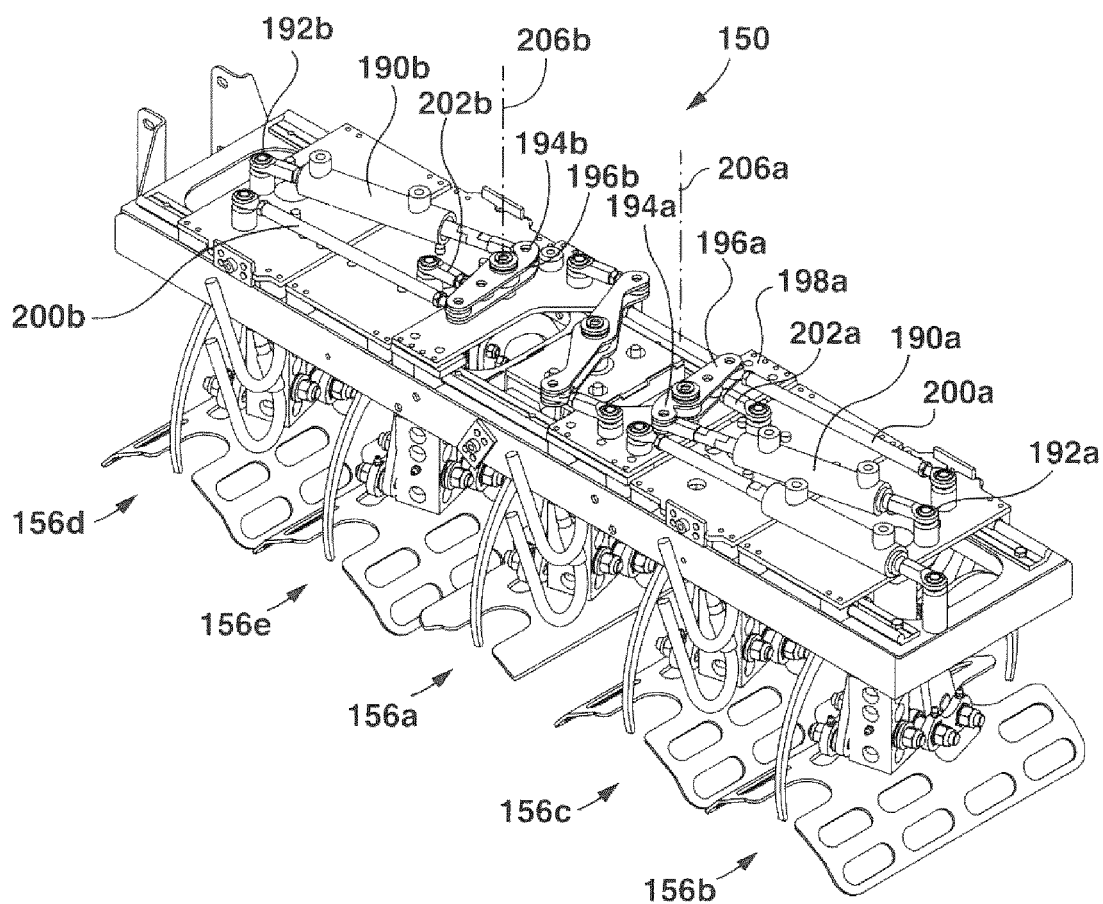
FIG. 11 is a perspective view of the sod handling apparatus of FIG. 8 in a contracted configuration.
Figure 12:
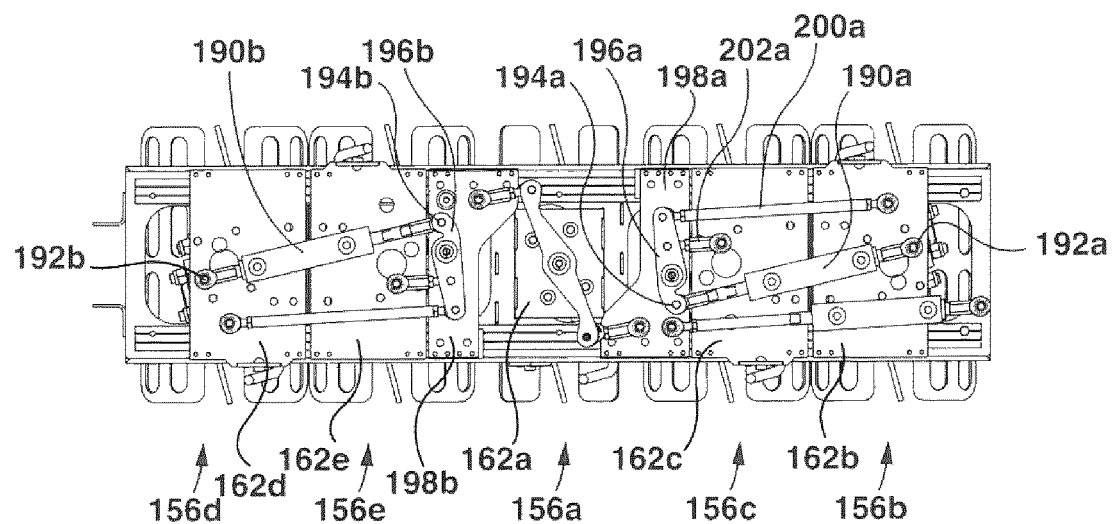
FIG. 12 is a top view of the sod handling apparatus in the position of FIG. 11.
Figure 13:
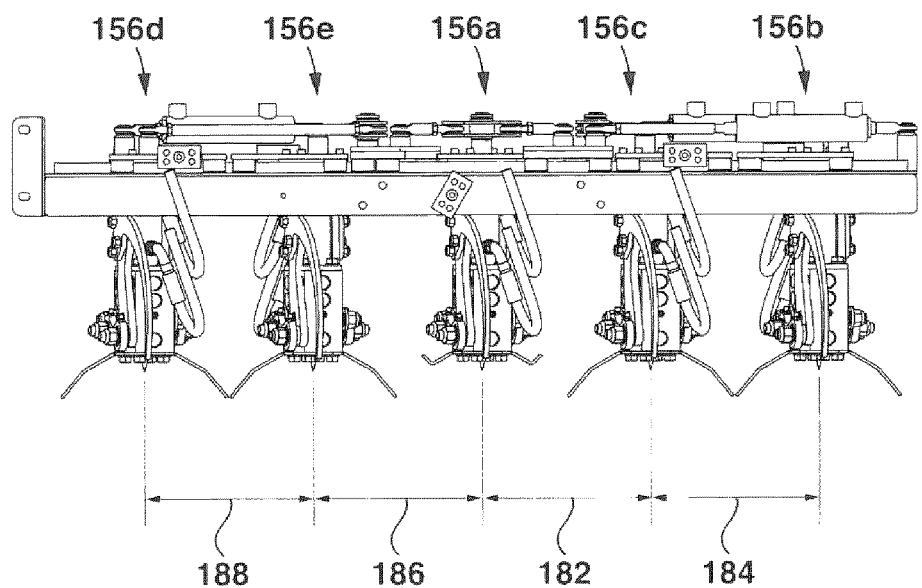
FIG. 13 is a front view of the sod handling apparatus in the position of FIG. 11.

Referring to FIGS. 11-13, when the sod handling apparatus 150 is in a first contracted configuration the second, third, fourth and fifth sod carriers 156*b-e* are each translated axially inwardly, toward the first sod carrier 156*a* (i.e. are squeezed together). In this configuration, the third sod carrier 156*c* is shifted toward the first sod carrier 156*a* so that the offset distance 182 between the third sod carrier 156*c* and the first sod carrier 156*a* is less than it was in the extended configuration (FIG. 10). Similarly, the second, fourth and fifth sod carriers 156*b*, 156*d* and 156*e* are each translated so that the offset distances 184, 186 and 188 between the third, fifth and first sod carriers 156*c*, 156*e* and 156*a*, respectively, are less than they were in the expanded configuration.

In the illustrated example, in the first contracted configuration each of offset distances 182, 184, 186 and 188 are reduced by the same amount, so that the sod carriers 156*a-e* are equally spaced from each other while in the first contracted configuration, but are more closely positioned than they were in the expanded configuration. To maintain this desired spacing, when in the first contracted configuration the second and fourth sod carriers 156*b* and 156*d* travel inwardly by about twice the distance that the third and fifth sod carriers 156*c* and 156*e* travel. For example, in the illustrated example, the third and fifth sod carriers 156*c* and 156*e* are each translated inwardly by about 0.9 inches, whereas the second and fourth sod carriers 156*b* and 156*d* are each translated inwardly by about 1.8 inches, so that each of the offset distances 182, 184, 186 and 188 is about 8.5 inches. Alternatively, the offset distances 182, 184, 186 and 188 need not be equal to each other when the sod handling apparatus 150 is in the first contracted configuration.

Figure 14:
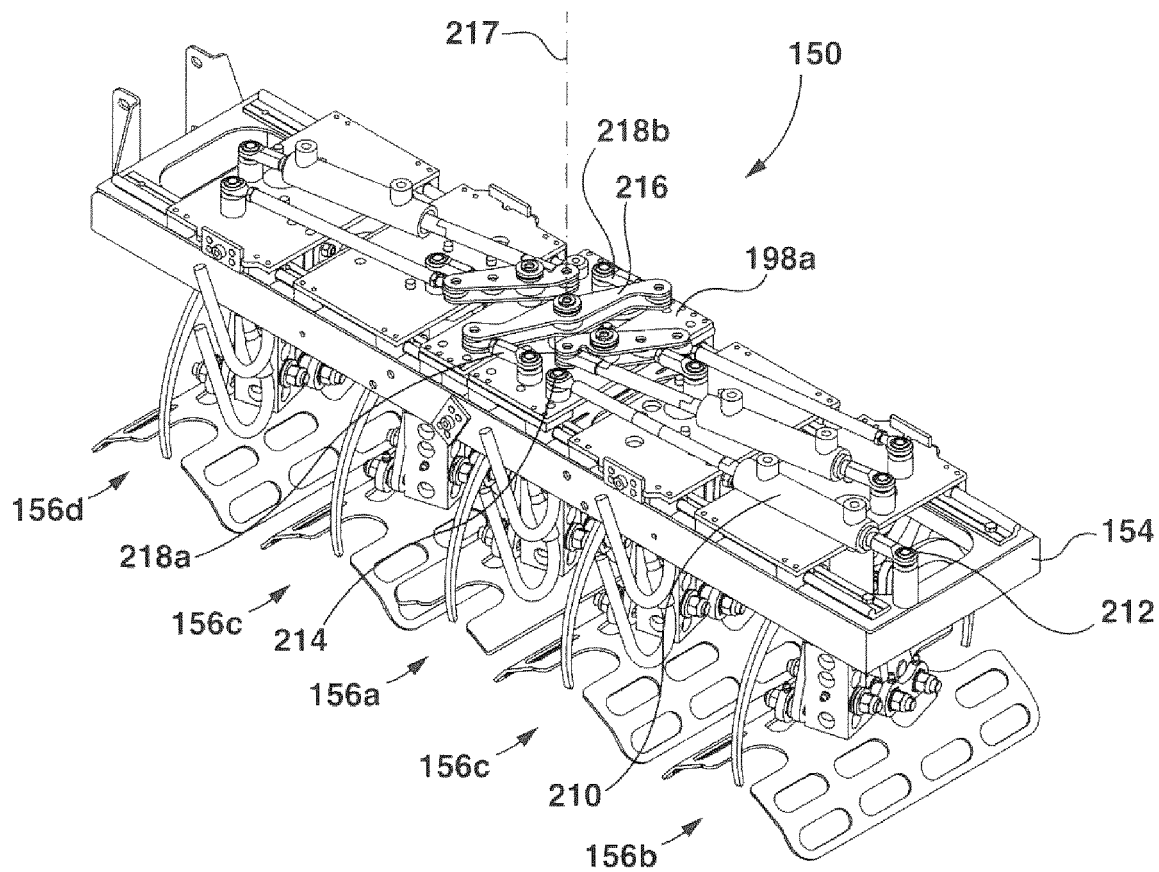
FIG. 14 is a perspective view of the sod handling apparatus of FIG. 8 in another contracted configuration.
Figure 15:
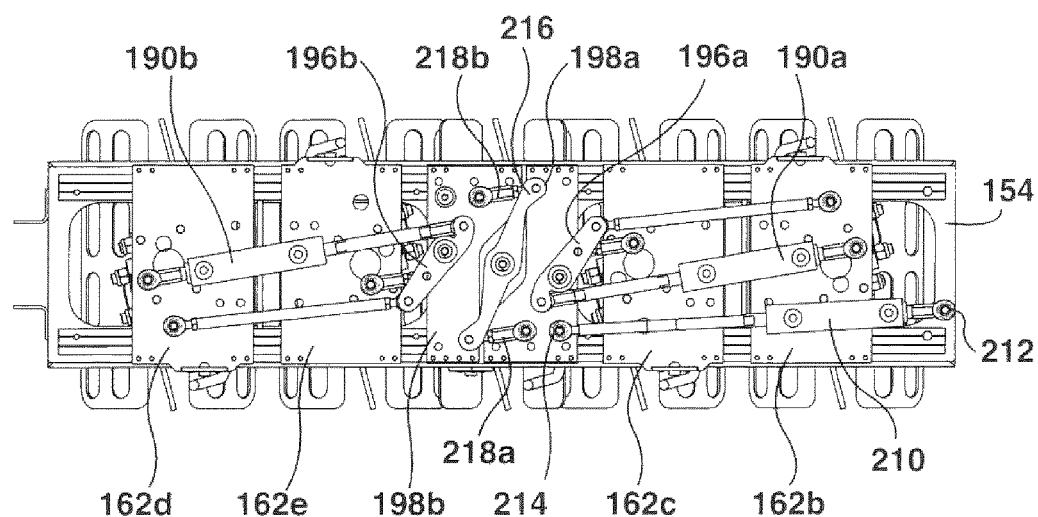
FIG. 15 is a top view of the sod handling apparatus in the position of FIG. 14.

Referring to FIGS. 14-16, when the in the second contracted configuration, the second and third sod carriers 156*b* and 156*c* are shifted toward the first sod carrier 156*a*, while maintaining their original spacing 184 relative to each other. Similarly, the fourth and fifth sod carriers 156*c* and 156*d* are shifted as a pair toward the first sod carrier 156, while maintaining their relative spacing 188. In this configuration, the offset distance 182 between the third sod carrier 156*c* and the first sod carrier 156*a* is less than it was in the expanded configuration (FIG. 10), and is less than the offset distance 184 between the second sod carrier 156*b* and the third sod carrier 156*b*. Optionally, the head 152 can be configured so that the offset distance 184 between the second and third sod carriers 156*b* and 156*c* in the second contracted configuration is the same as the offset distance between the second and third sod carriers 156*b* and 156*c* in the expanded configuration. Alternatively, the offset distance 184 between the second and third sod carriers 156*b* and 156*c* in the second contracted configuration may be less than their original spacing when in the expanded configuration while still being greater than the offset distance 182 between the first and third sod carriers 156*a* and 156*c*.

In the illustrated example, the fourth and fifth sod carriers 156*c* and 156*d* are moved in the same manner so that the offset distance 186 between the fifth sod carrier 156*e* and the first sod carrier 156*a* is less than it was in the expanded configuration (and is equal to the offset distance 182 between the first and third sod carriers 156*a* and 156*c*), and is less than the offset distance 188 between the fourth sod carrier 156*d* and the fifth sod carrier 156*e*. The offset distance 188 between the fourth and fifth sod carriers 156*d* and 156*e* in the second contracted configuration is the same as the offset distance 188 between the fourth and fifth sod carriers 156*d* and 156*e* in the expanded configuration, and is equal to the offset distance 184 between the second and third sod carriers 156*b* and 156*c*. Alternatively, the offset distance 188 between the fourth and fifth sod carriers 156*d* and 156*e* in the second contracted configuration may be less than the offset distance 188 in the expanded configuration while still being greater than the offset distance 186 between the first and fifth sod carriers 156*a* and 156*e*. In the illustrated example, when the sod handling apparatus 150 is in the second contracted configuration, the offset distances 182 and 186 are be reduced to about 6.6 inches, while the offset distances 184 and 188 remain approximately 9.6 inches. In this configuration, the distances 182 and 186 are each less than the diameter 138 of the rolls 116, and the sum of distances 182 and 186 is between about 100% and about 175% of the diameter 138, and may be between about 110% and about 150% of the diameter 138.

In the illustrated example, when in this configuration the sod carriers 156*e* and 156*c* are so closely spaced that they occupy some of the area beneath the first sod carrier 156*a*, such that the sod rolls carried by the carriers 156*c* and 156*e* would interfere with a sod roll carried in sod carrier 156*a*. In most operating conditions, this configuration will only be utilized if the centre sod carrier 156*a* is empty (for example, after having deposited its sod roll).

Referring to FIGS. 17-19, optionally the sod handling apparatus 150 can be configured in a third contracted configuration. In the third contracted configuration the third sod carrier 156*c* is moved closer to the first sod carrier 156*a* than it was in either of the first or second contracted configurations, such that the offset distance 182 between first sod carrier 156*a* and the third sod carrier 156*c* is less than it was in any of the expanded configuration, the first contracted configuration or the second contracted configuration. The second sod carrier 156*b* is translated inwardly so that the offset distance 184 between the second sod carrier 156*b* and third sod carrier 156*c* is less than it was in the expanded configuration, and optionally so that it is equal to the offset distance 184 in the first contracted configuration (FIG. 13). Similarly, fifth sod carrier 156*e* is moved closer to the first sod carrier 156*a* than it was in either of the first or second contracted configurations, such that the offset distance 186 between first sod carrier 156*a* and the fifth sod carrier 156*e* is less than it was in any of the expanded configuration, the first contracted configuration or the second contracted configuration. The fourth sod carrier 156*d* is translated inwardly so that the offset distance 188 between the fourth sod carrier 156*d* and fifth sod carrier 156*e* is less than it was in the expanded configuration, and optionally so that it is equal to the offset distance 188 in the first contracted configuration (FIG. 13). The third contracted configuration can be thought of as a combination of the first and second contracted configurations in as much as the second and third sod carriers 156*b* and 156*c*, and fourth and fifth sod carriers 156*d* and 156*c*, are squeezed together as in the first contracted configuration (FIG. 13), and then further shifted in unison as a pair closer to the first sod carrier 156a (as shown in FIG. 16), while keeping their relative spacing constant. In this configuration, the distances 182 and 186 are each less than the diameter 138 of the rolls 116, and the sum of distances 182 and 186 is between about 100% and about 175% of the diameter 138, and may be between about 110% and about 150% of the diameter 138. In the illustrated example, the distances 182 and 186 can each be equal to or less than about 6 inches, and the distances 184 and 188 can each be equal to or less than about 9 inches.

To move the second, third, fourth and fifth sod carriers 156b-e along the rails 158, the sod handling apparatus 150 can be provided with one or more actuator mechanism. Optionally, the sod handling apparatus can include two or more actuator mechanisms. For example, the sod handling apparatus 150 may include a first actuator mechanism (described in more detail below) for shifting between the expanded configuration (FIG. 10) and the first contracted configuration (FIG. 13), and a second actuator mechanism (described in more detail below) for shifting between the expanded configuration (FIG. 10) and the second contracted state (FIG. 16). The first and second actuator mechanisms may be independently operable.

Optionally, the sod handling apparatus 150 can be configured such that triggering both the first and second actuator mechanisms reconfigure configure the sod handling apparatus from the expanded configuration (FIG. 10) to the third contracted configuration (FIG. 19). The first and second actuator mechanisms can be operable in unison with each other so that the sod handling apparatus 150 can be reconfigured directly from the expanded configuration to the third contracted configuration. Alternatively, the first and second actuator mechanisms can be operated in series so that triggering the first actuator mechanism can transition the sod handling apparatus from the expanded configuration to one of the first contracted configurations, and then triggering the second actuator mechanism can transition the sod handling apparatus from the first contracted configuration to the third contracted configuration (or vice versa).

The actuator mechanism(s) may include any suitable type of actuators, including, for example, hydraulic cylinders, pneumatic cylinders, ball screws, belt drives, electric motors, gears, levers, linkages, springs and any other suitable mechanisms.

In the illustrated example the sod handling apparatus 150 includes an actuator for moving the second and third sod carriers 156b and 156c between the expanded configuration and the first contracted configuration, and a corresponding actuator for moving the fourth and fifth sod carriers. While the actuator for use with the second and third sod carriers 156b and 156c is described in detail herein, the actuator used with the fourth and fifth sod carriers 156d and 156e are generally identical to the actuator used with the second and third sod carriers 156b and 156c and are arranged in a generally mirror image configuration so as to function in an analogous manner. The actuator used with the fourth and fifth sod carriers 156d and 156c is identified using the same reference characters as the actuator used with the second and third sod carriers 156b and 156c, modified with a "b" suffix.

Referring to FIGS. 11 and 12, in the illustrated example the sod handling apparatus 150 includes an actuator in the form of a hydraulic cylinder 190a that is used to reconfigure the sod handling apparatus 150 between the expanded configuration and the first contracted configuration. The hydraulic cylinder 190a has a first end 192a that is connected to the base plate 162b of the second sod carrier 156b via a pin joint. The opposed second end 194a of the hydraulic cylinder 190a is connected to one end of a linkage arm 196a, which itself is rotatably coupled to a support plate 198a. The linkage arm 196a is coupled to the base plate 162b of the second sod carrier 165b by a relatively longer connecting rod 200a, and is coupled to the base plate 162c of the third sod carrier 156c by a relatively shorter connecting rod 202a. The connecting rods 200a and 202a are pivotally coupled to the linkage arm 196a, and are connected so that the connecting rod 200a attached to the second sod carrier 156b is connected outboard from the connecting rod 202c attached to the third sod carrier 156c. In this configuration, the effective lever length at the connection point of the longer connecting rod 200a (relative to the pivot axis 206a of the linkage arm 196a) is approximately twice that of the attachment point of the shorter connecting rod 202a.

When the hydraulic cylinder 190a is activated (i.e. when the cylinder contracts), it causes a rotation of the linkage arm 196a (counterclockwise as illustrated in FIG. 12), which in turn urges the connecting rods 200a and 202a to the left (as illustrated), thereby drawing the second and third sod carriers 156b and 156c inwardly, toward the first sod carrier 156a. Due to the different attachment positions of the connecting rods 200a and 202a, the second sod carrier 156b is translated inwardly approximately twice as far as the third sod carrier 156c for a given angular rotation of the linkage arm 196a. This may help achieve the desired relative positioning of the second and third sod carriers 156b and 156c.

In the illustrated example, the hydraulic cylinder 190a is mounted on and partially supported by the movable base plate 192b of the second sod carrier. In this configuration, the hydraulic cylinder 190a itself translates inwardly with the second base plate 162b, such that when the sod handling apparatus 150 is in the first contracted configuration (FIG. 12) the first end 192a of the hydraulic cylinder 190a is positioned closer to the first sod carrier 156a than it was when the sod handling apparatus 150 was in the expanded configuration (FIG. 10).

Referring to FIGS. 14 and 15, in the illustrated example the sod handling apparatus 150 includes a separate actuator, in the form of shift hydraulic cylinder 210, for reconfiguring the sod handling apparatus 150 between the expanded configuration (FIG. 10) and the second contracted configuration (FIG. 15).

In the illustrated example the shift hydraulic cylinder 210 has one end 212 coupled to the frame 154, and a second end 214 coupled to the support plate 198a. The support plate 198a is also connected to one end of a crank arm 216 via a rod 218a. The crank arm 216 is rotatable about a rotation axis 217 that is parallel to, and spaced apart from the axes 206a and 206b. The support plate 198a is slidably coupled to the frame 154, and can slide along the rails 158 toward and away from the base plate 162a of the first sod carrier 156a. In contrast, the crank arm 216 is rotatably coupled to the frame 154 adjacent the first base plate 162a, and is rotatable, but not translatable, relative to the frame 154.

When the shift hydraulic cylinder 210 is actuated and extended, the support plate 198a is shifted inwardly toward the first sod carrier 156a. As the linkage arm 196a is also mounted to the support plate 198a, translating the support plate 198a also translates the linkage arm 196a. Translating the linkage arm 196a may cause the second and third sod carriers 156b and 156c to translate inwardly toward the first sod carrier 156a. If the hydraulic cylinder 190a is not activated, and therefore remains a fixed length to inhibit rotation of the linkage arm 196a, both the second and third sod carriers will be linked together such that they translate inwardly by the same amount.

When the support plate shifts 198a inwardly it causes a corresponding rotation of the crank arm 216 (clockwise as illustrated in FIG. 15). In the illustrated example, the crank arm 216 is also connected to the support plate 198b, which in turn is connected to the fourth and fifth sod carriers 156d and 156e. Because the crank arm 216 is generally symmetrical in the example illustrated, inward movement of the support plate causes 198a a corresponding, proportional and simultaneous inward movement of the support plate 198b (and the fourth and fifth sod carriers 156d and 156e). In this configuration, triggering the shift hydraulic cylinder 210 can result in the synchronized shifting of the second, third, fourth and fifth sod carriers 156b, 156c, 156d and 156e, and can reconfigure the sod handling apparatus 150 between the expanded configuration (FIG. 10) and the second contracted configuration (FIG. 15).

To arrange the sod handling apparatus 150 in the third contracted configuration, both the shift hydraulic cylinder 210 and the hydraulic cylinders 190a and 190b can be activated. Referring to FIGS. 17 and 18, activating both the shift hydraulic cylinder 210 and the hydraulic cylinders 190a and 190b can cause the second and third sod carriers 156b and 156c to move inwardly (as shown in FIG. 12), and to move closer together (as shown in FIG. 15) to arrive in the configuration illustrated in FIG. 18.

The sod handling apparatus 150 may be adjustable between the different configurations while the head 152 is stationary and optionally when the head is moving. Further, the sod handling apparatus 150 may be adjustable when some or all of the sod carriers 156a-e are holding sod rolls 116, and when the sod carriers 156a-e are empty. For example, the sod handling apparatus 150 may be operable to allow a user to position the sod handling apparatus in a sod pick-up location containing a plurality of pieces of sod (such as the accumulator 118 of the sod harvester 100), pick up pieces of sod with each of the sod carriers 156 while the sod handling apparatus 150 is in a first configuration; move the sod handling apparatus 150 to a sod drop-off location (such as over a pallet 122 or other location); and change the configuration of the sod handling apparatus 150 before depositing the pieces of sod. Optionally, the first sod carrier 156a can be actuated to drop its piece of sod while in the first configuration (for example to place a single roll of sod between side rows 140 in a first layer 130a of the CHEP pallet to form part of the centre row 142), and then the configuration of the sod handling apparatus 150 can be changed prior to depositing the sod rolls from the remaining sod carriers 156b-e (for example to form the row 144 of four sod rolls in the second layer 140b on the CHEP pallet 122—FIGS. 3-6). The reconfiguration can optionally occur when the sod handling apparatus 150 has reached the sod drop off location (i.e. while positioned over the pallet), or optionally can occur while the sod handling apparatus is in transit between the sod pick-up location and the sod drop-off location. Reconfiguring the sod handling apparatus 150 while it is in transit may help reduce stacking time. To stack the sod as illustrated in FIGS. 3-6, the sod handling apparatus can be operated to simultaneously place five sod rolls in row 140, then place another five sod rolls to form the other outer row 140. After forming the outer rows 140, the sod handling apparatus 150 can be operated to use the first sod carrier 156a to deposit one roll of sod into row 142, and the remaining sod carriers 156b-e can be reconfigured into one of the contracted configurations and rotate 90 degrees so that the remaining four sod rolls in carriers 156b-e can be deposited as a row 144 to begin the second layer 130b, without the need for returning to the sod pick-up location.

This process can be repeated to fill in the other two sod rolls that form part of centre row 142, and then to provide the remaining two rows 144 on layer 130b. When layer 130b is complete, the entire process can be repeated to construct additional layers.

Figure 21:
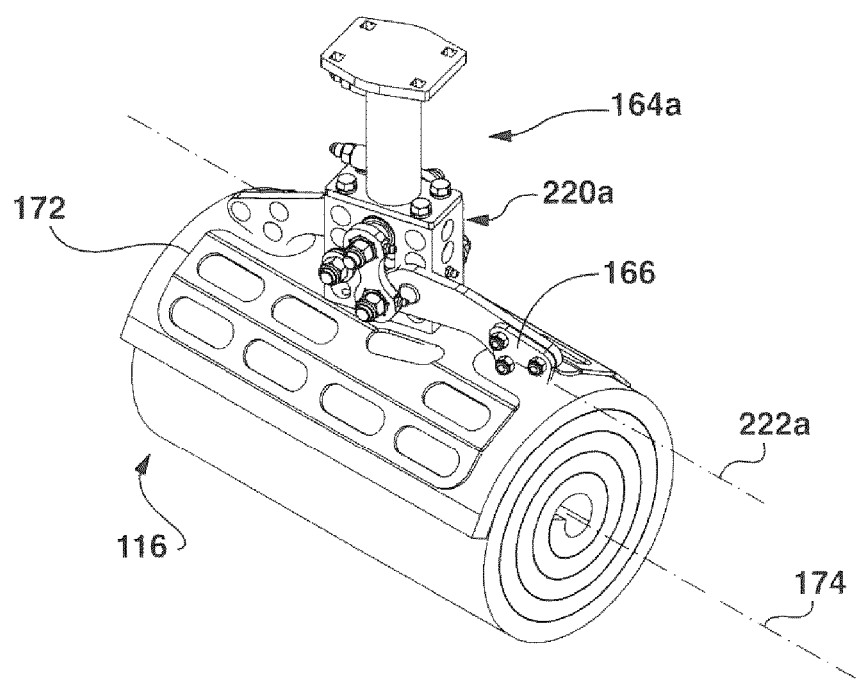
FIG. 21 is another perspective view of the portion of the sod handling apparatus of FIG. 20, holding a sod roll.

Referring to FIGS. 20 and 21, the first gripper 164a includes a body portion 220a that supports the tines 166. The first gripper 164a also defines a body axis 222a that extends orthogonal to the head axis 160 (FIG. 8) and, in the illustrated example, is substantially parallel to (i.e. within about 5 to 10 degrees of) the sod roll axis 174 when the sod roll 116 is engaged by the first gripper 164a. The first gripper 164a also defines a central plane 224a, which in the example illustrated is orthogonal to the body axis 222a.

Figure 22:
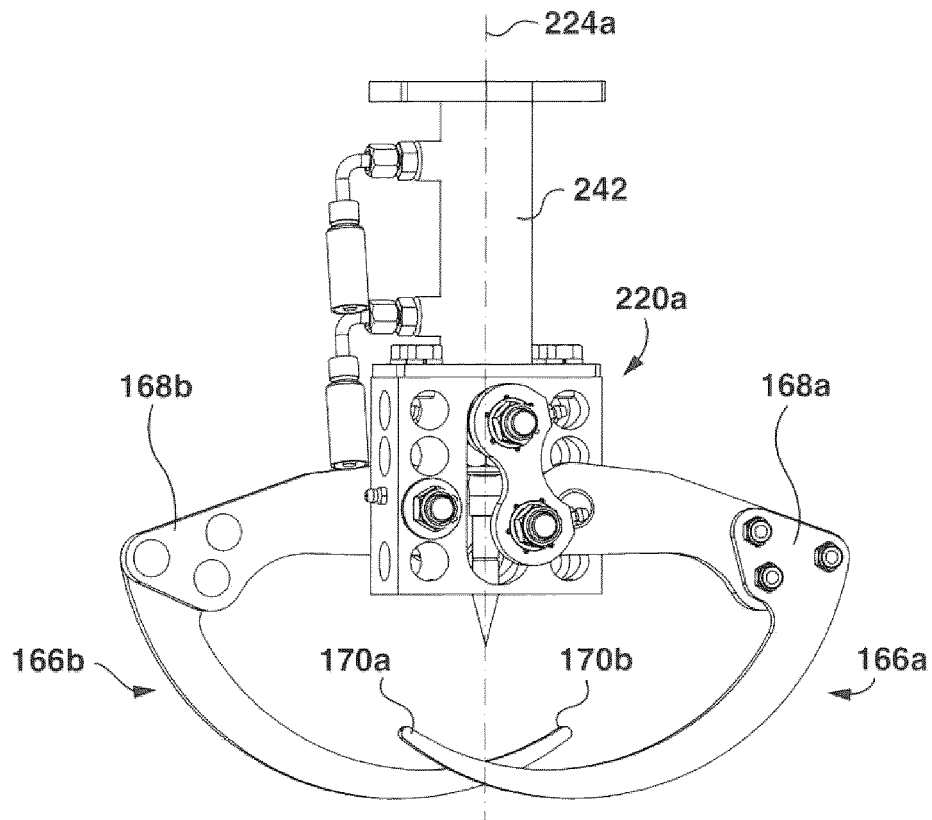
FIG. 22 is a side view of a portion of the sod handling apparatus of FIG. 8, in an engaged configuration.
Figure 23:
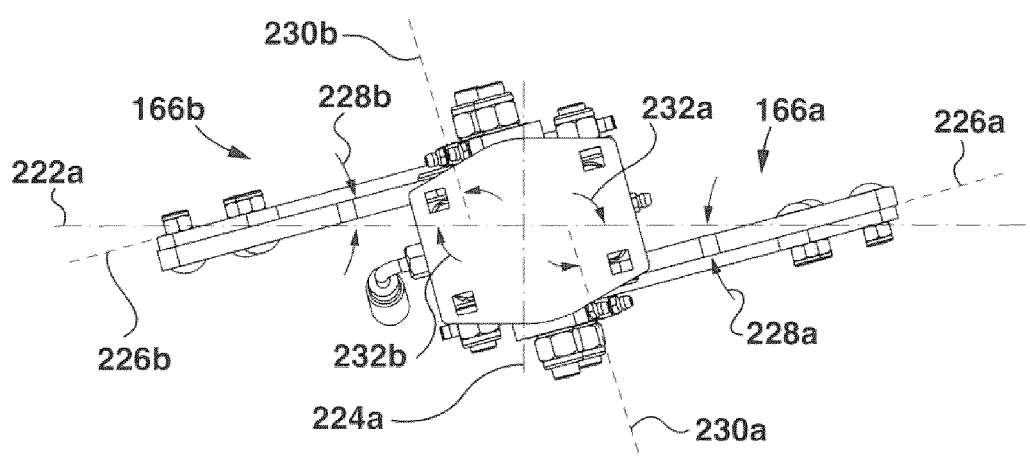
FIG. 23 is a top view of the portion of the sod handling apparatus of FIG. 22.

Referring also to FIGS. 22 and 23, in the first sod gripper 164a includes a first tine 166a and a second tine 166b, each with a respective body 168a and 168b, and tip 170a and 170b. Each tine 166a and 166b is moveable between a retracted position (FIGS. 24 and 25) in which the tips 170a and 170b are spaced apart from the sod roll 116, and an engaged position (FIGS. 21, 22 and 23) in which the tips 170a and 170b have pierced the outer surface of the sod roll 116 and at least a portion of the body 168a and 168b of each tine 166a and 166b is embedded within the sod roll 116. This may help facilitate retaining the sod rolls. In the illustrated example, each tine is pivotable about a respective pivot axis 230a and 230b (FIG. 23).

When moving between the retracted and engaged positions each tine 166a and 166b, and specifically each tip 170a and 170b, travels in a respective piercing direction, represented by axes 226a and 226b respectively (FIG. 23). The first piercing direction 226a is at a first angle 228a relative to the body axis 222a, and the second piercing direction 226b is at a second angle 228b relative to the body axis 222a. The first and second angles 228a and 228b may be any suitable angle between about 0 degrees and about 90 degrees, and preferably may be between about 0 and about 45 degrees, between about 5 and about 30 degrees and between about 10 and 25 degrees relative to the body axis 222a. Optionally, the first and second angles 228a and 228b may be about 15 degrees. Tines arranged in this manner can be described as longitudinal and/or axial aligned tines because, in the illustrated configuration, the tips 170a and 170b of the tines 166a and 166b travel through the interior of the sod rolls a generally longitudinal/axial direction, as opposed to piercing the rolls in a substantially radial as is done in conventional sod handing apparatuses.

In the illustrated configuration, when moving between the retracted and engaged positions each tine 166a and 166b, and specifically each tip 170a and 170b, pierces an upper portion of the outer surface of the sod roll 116 (or optionally an axial end face of the sod roll), instead of engaging a side portion of the outer surface as would be engaged using radially moving tines. Configuring the tines 166a and 166b to move generally axially may help reduce the amount of clearance around the sides of the sod roll 116, and between adjacent sod rolls 116, that is required to facilitate gripping/depositing of the sod rolls 116. Reducing the clearance required between adjacent sod rolls 116 required for gripping the sod rolls 116 may help facilitate gripping and/or depositing sod rolls 116 in a tightly spaced configuration.

In the illustrated example the first and second angles 228a and 228b are equal. In alternative embodiments, the first and second angles may be different.

Figure 24:
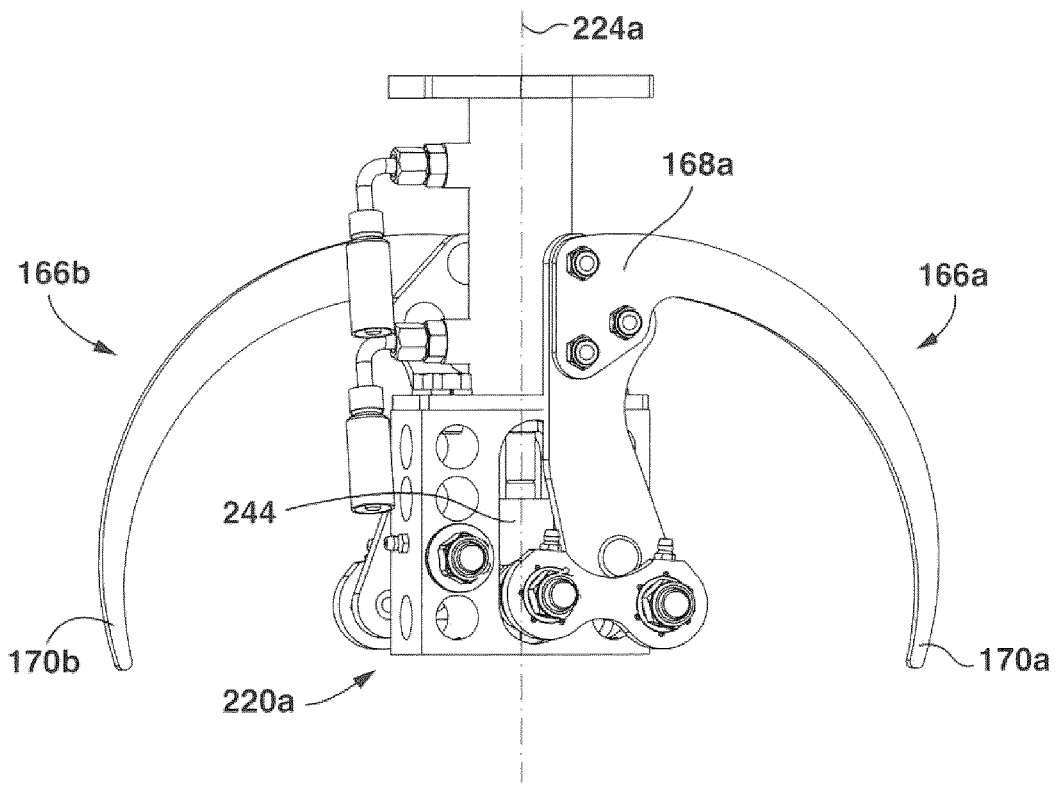
FIG. 24 is a side view of the portion of the sod handling apparatus of FIG. 22, in a retracted configuration.
Figure 25:
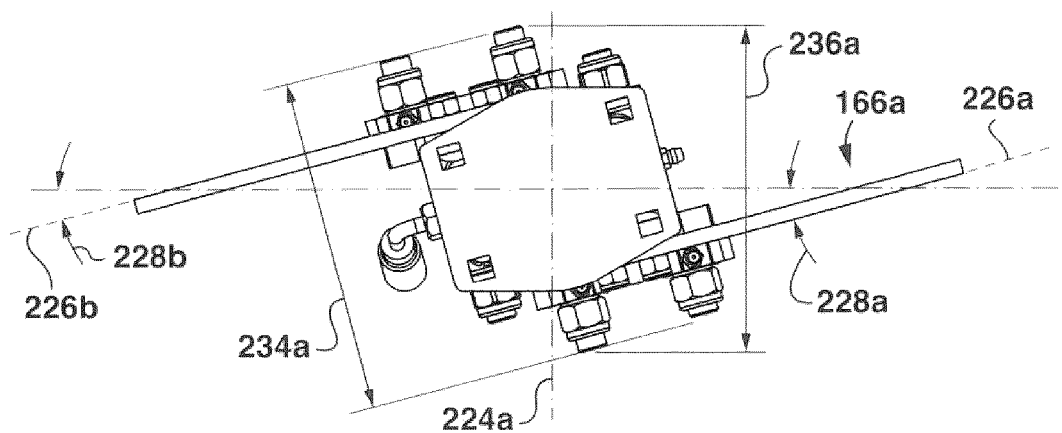
FIG. 25 is a top view of the portion of the sod handling apparatus of FIG. 24.

Optionally, the tines 166a and 166b can be sized so that they at least partially overlap each other in the axial direction when in the engaged position. This may help retain the sod roll 116. Referring to FIGS. 22 and 24, in the illustrated example, when the first tine 166a is in its retracted positions (FIG. 24) the tip 170a is on one side of the plane 224a (to the right as illustrated). When the first tine 166a moves to its engaged position (FIG. 22), the tip 170a is position on the other side of the plane 224a (to the left as illustrated). The second tine 166b operates in a reciprocal manner.

Referring to FIG. 23, to help facilitate the desired alignment of the tines 166a and 166b, the pivot axes 230a and 230b are arranged at respective angles 232a and 232b relative to the body axis 222a. In the illustrated example, the angles 232a and 232b are complimentary to the angles 228a and 228b and are approximately 75 degrees (but in other embodiments may be between about 0 and about 90 degrees). In this configuration, the first gripper 164a has a lateral width 234a, that is measured between the outermost portions of the first gripper 164a in a direction that is parallel to the pivot axes 230a and 230b. In the illustrated example, the first gripper 164a also has an effective width 236a that is measured in a direction parallel to the central plane 224a. Optionally, as illustrated, the first gripper 164a can be configured so that the effective width 236a is less than the lateral width 234a. Configuring the first gripper 164a to have a relatively small effective width 236a may help reduce the amount of space required to accommodate the first gripper 164a. Optionally, as shown in the illustrated example, the width 236a of the grippers 164 may be the laterally widest portion of the sod carriers 156. In this configuration, the overall width of the sod carrier 156 may be less than the width of the sod rolls to be picked up with the sod carrier, which may help facilitate relatively close spacing of adjacent sod carriers 156a-e. For example, in the illustrated configuration the width 236a is less than the diameter 138 of the sod roll 116 that is intended to be grasped by the sod carrier 156 (see also FIG. 21). In this arrangement, physical contact between adjacent sod rolls 116 may limit how closely two adjacent sod carriers 156 can be positioned next to each other, and the sod carriers 156 may be moved closer to each other if one or both of the sod carriers are empty (see also FIG. 27).

Figure 26:
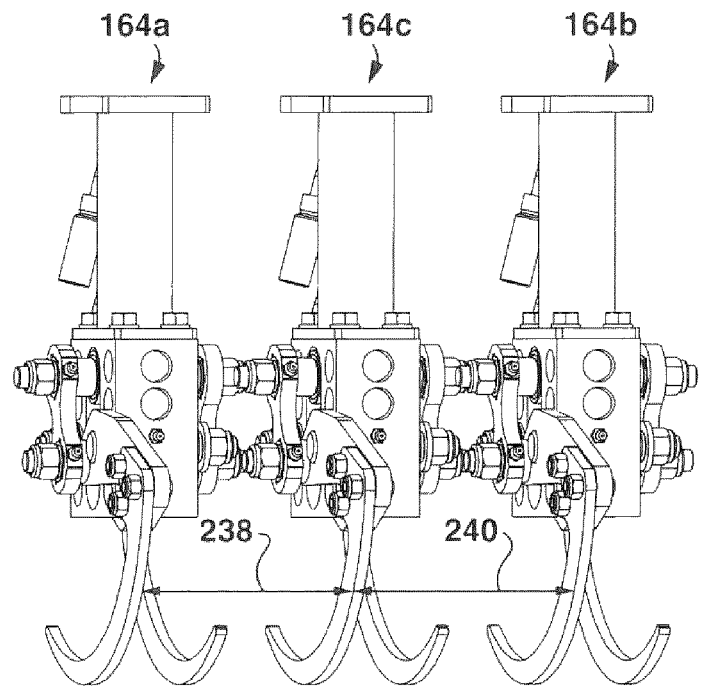
FIG. 26 is a perspective view of a portion of the sod handling apparatus of FIG. 8.
Figure 27:
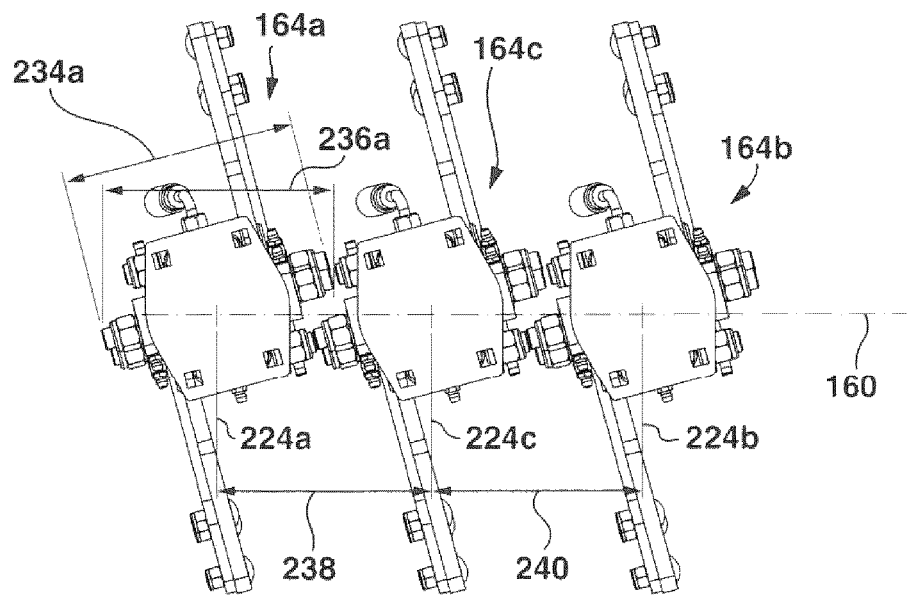
FIG. 27 is a top view of the portion of the sod handling apparatus of FIG. 26.

Referring to FIGS. 26 and 27, the first gripper 164a is illustrated in combination with the second and third grippers 164b and 164c. In the illustrated example, the first and third grippers 164a and 164c are separated by an offset distance 238, and the second and third grippers 164b and 164c are separated by an offset distance 240. Reducing the effective width 236a of each gripper 164a-c can help facilitate placing the grippers 164a-164c relatively close to each other, which may help reduce the overall width of the sod handling apparatus 150, and may help facilitate picking up or depositing relatively closely spaced sod rolls. Optionally, the grippers 164a-c can be positioned so that the offset distances 238 and 240 are less than the respective lateral widths 234a-c of the grippers 164a-164c.

Optionally, the grippers 164a-c can be configured such that when the grippers 164a-c are moved close together (such as when in the third contracted configuration), the grippers 164a-c may partially overlap or partially nest with each other in the direction of the head axis 160 (FIGS. 10 and 27). Configuring the grippers 164a-c to at least partially overlap each other in this manner may help facilitate positioning the grippers 164a-c relatively close to each other. In the illustrated example, the gripper 164a-c can nest with each other to such an extent that the offset distances 238 and 240 are less than the lateral width 234a and are less than the effective width 236a.

For example, in the illustrated embodiment the lateral width 234a is about 5.7 inches, while the effective width 236a is about 5.6 inches and the offset distances 238 and 240 are about 5.1 inches. In the illustrated configuration, arranging the grippers 164a-c so that the pivot axes 230 are a non-orthogonal angle 232 relative to the body axis 222a can allow the grippers 164a-c to be more closely spaced together than if the pivot axes 230 were orthogonal to the body axis 222a.

Referring to FIG. 22, the first gripper 164a includes an actuator in the form of a hydraulic actuator having a cylinder 242 and a slidable piston 244 (FIG. 24) that is operable to move the tines 166a and 166b between their retracted and engaged positions. In the illustrated example, the cylinder 242 is oriented vertically (i.e. parallel to the central plane 224a and orthogonal to the body axis 222a and the head axis 160), and the piston 244 translates vertically. The piston 244 is drivingly connected to both tines 166a and 166b, and in the illustrated example the tines 166a and 166b can move toward and away from each other in unison. While illustrated as a single hydraulic cylinder, in other embodiments the actuator that is operably connected to the tines 166a and 166b may be any other suitable type of actuator (such as a ball screw, gear, lever or linkage) and may include more than one separate actuator. For example the actuator may include two separate hydraulic cylinders, one connected to each tine 166. This may allow the tines 166a and 166b to be operated independently of each other.

Alternatively, instead of a hydraulic actuator, the first gripper may be provided with any other suitable type of actuator, including gears, mechanical linkages and electrical actuators.

In this configuration, the movement axis of the actuator (i.e. an axis lying in the plane 224a) will intersect the sod roll 116 that is being carried in the first gripper 164a. Arranging the cylinder 242 vertically, instead of, for example parallel to the body axis 222a or the piecing directions 226a and 226b, may help reduce the effective width 236a of the first gripper 164a. This may help reduce the overall size of the sod handling apparatus 150, and may help facilitate the relatively close spacing between adjacent grippers 164a-c.

While the first gripper 164a and the relation between the first, second and third grippers 164a-c has been described in detail above, the other grippers 164b-164e may have an identical configuration, and the fourth and fifth grippers 164d and 164e may be moved and nested in the same manner as the second and third grippers 164b and 164c.

Figure 34:
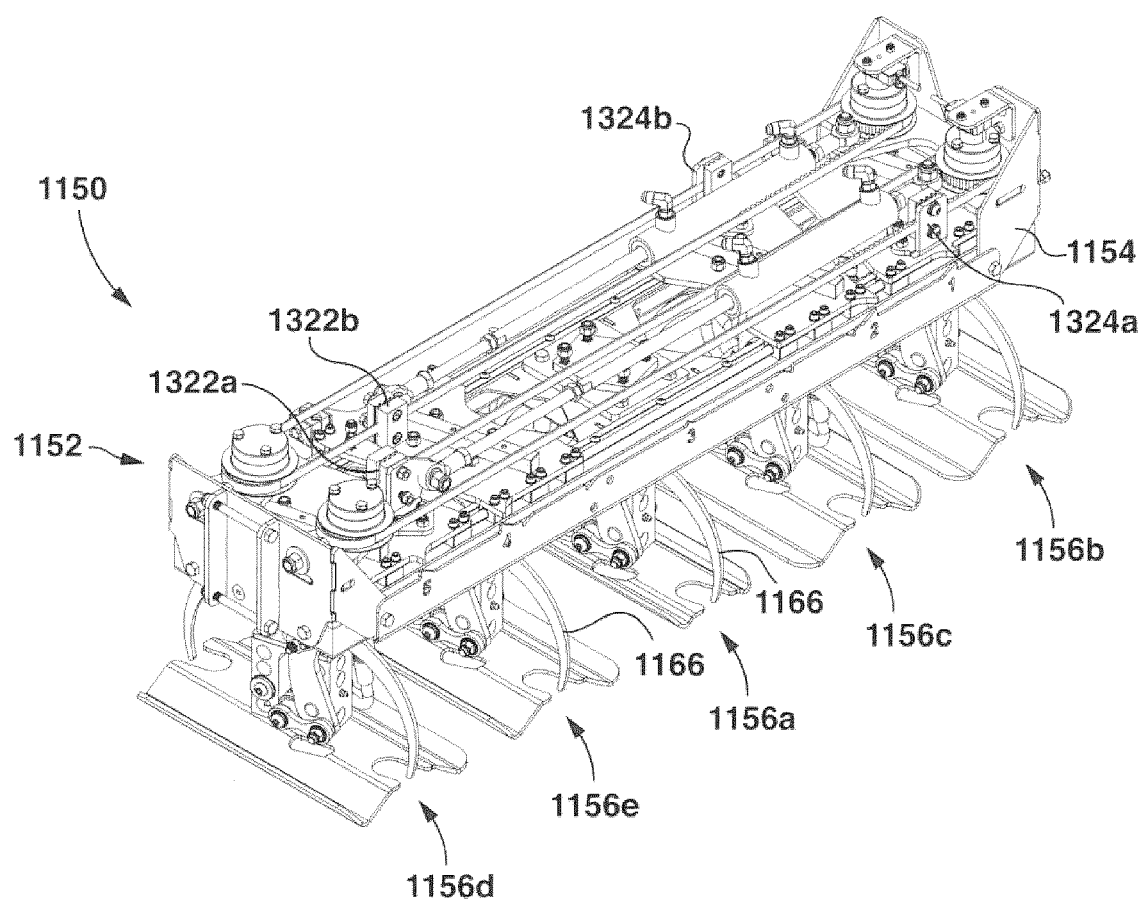
FIG. 34 is a perspective view of another example of a sod handling apparatus in one configuration.

Referring to FIG. 34, another example of a new sod handling apparatus 1150 that can be connected to the gantry apparatus 126 of the sod harvester 100 is illustrated. The sod handing apparatus 1150 is analogous to sod handling apparatus 150, and like features are identified using like reference characters indexed by 1000.

In the illustrated example, the sod handling apparatus 1150 includes a head 1152 having a frame 1154 that supports five sod carriers 1156a-e, each of which is capable of picking up at least one sod roll 116 (or alternatively may be configured to pick up a sod slab). In this embodiment, the centre sod carrier 1156a is fixedly connected to the frame 1154 such that is does not slide relative to the frame 1154 while the apparatus 1150 is in use. The remaining sod carriers 1156b-e are movably mounted to the frame 1154.

Figure 36:
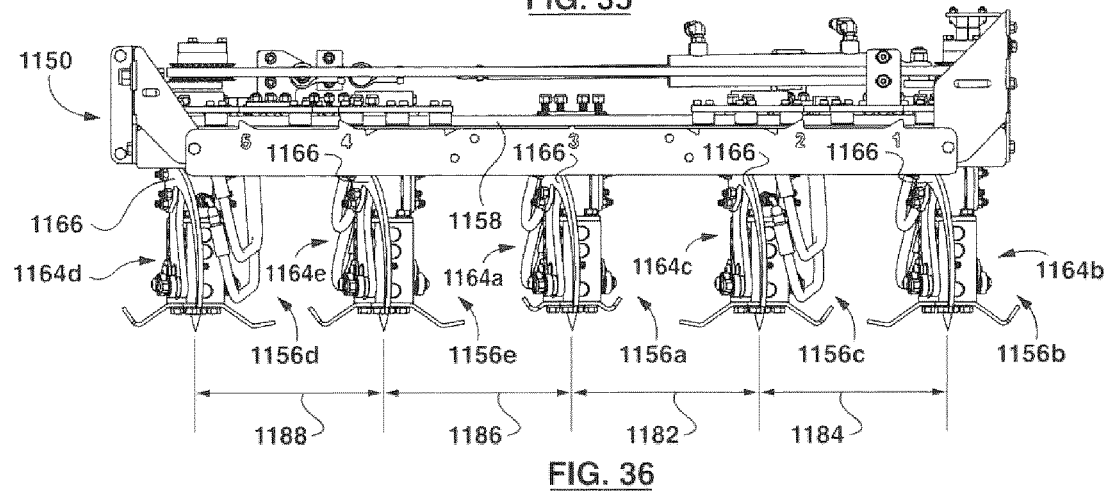
FIG. 36 is a front view of the sod handling apparatus of FIG. 34.

Referring also to FIG. 36, each sod carrier 1156a-e includes a respective gripper portion 1164a-e, having tines 1166 that function in the same manner as gripper portions 164a-e and tines 166 described previously.

Figure 35:
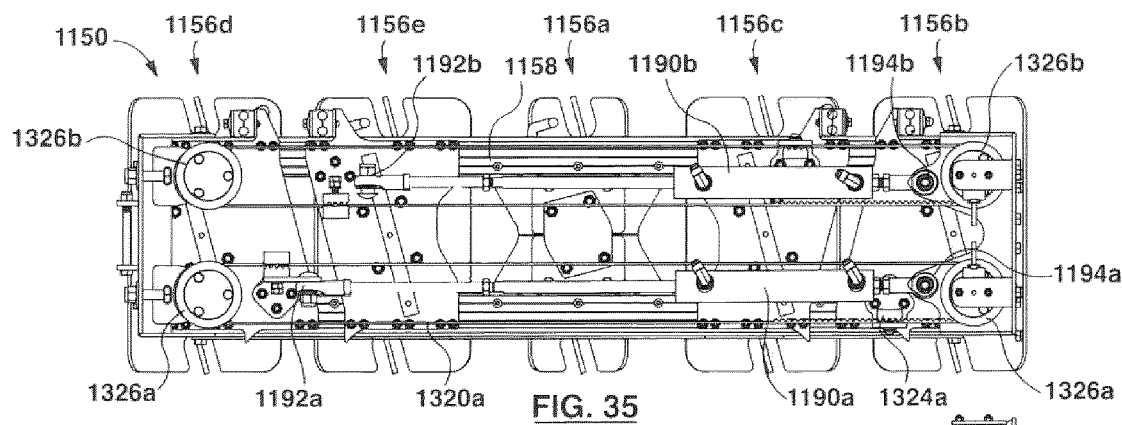
FIG. 35 is a top view of the sod handling apparatus of FIG. 34.
Figure 38:
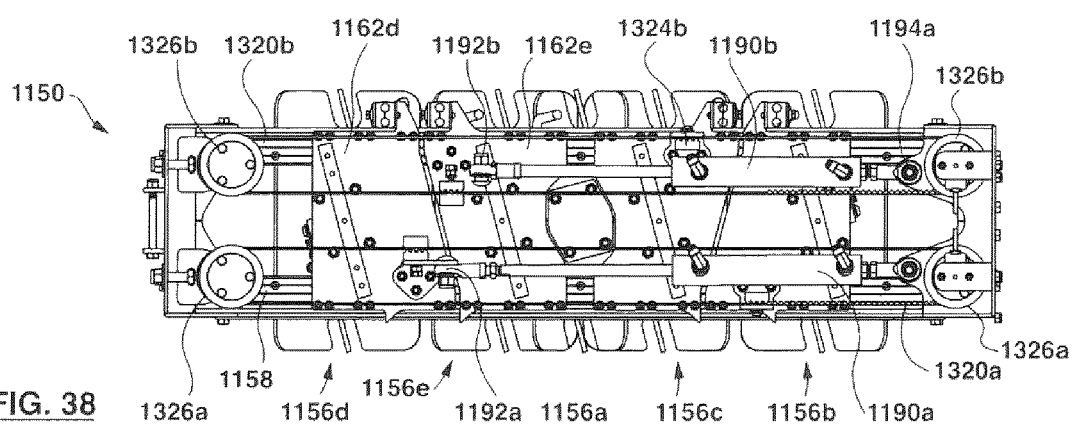
FIG. 38 is a top view of the sod handling apparatus of FIG. 37.

Like sod handling apparatus 150, the sod carriers 1156*b-e* can be moved relative to the head 1152 so that the sod handling apparatus 1150 can be reconfigured between an extend configuration as shown in FIG. 35 (analogous to FIG. 10) and at least one, and preferably more than one retracted configurations as shown in FIG. 38 (analogous to FIG. 19). The sod handling apparatus 1150 is also configurable in the retracted configurations analogous to those shown in FIGS. 13 and 16, as well as other spacings.

Referring to FIGS. 34-36, in the illustrated example when the sod handling apparatus is in the extended configuration the sod carriers 1156*a-e* are generally equally spaced from each other, and the distances 1182, 1184, 1186 and 1188 between adjacent ones of the sod carriers are generally equal.

Figure 37:
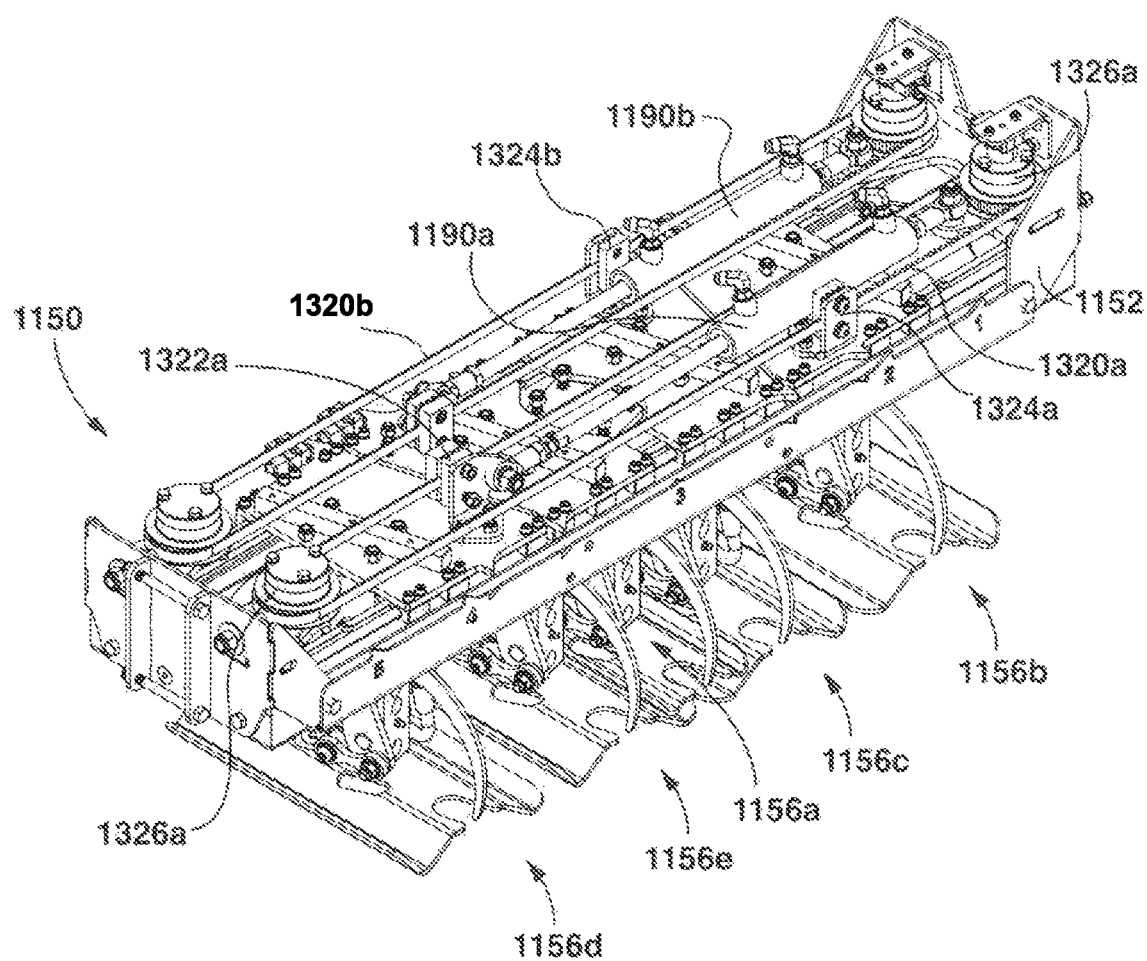
FIG. 37 is a perspective view of another example of the sod handling apparatus of FIG. 34 in another configuration.

Referring to FIGS. 37-39, when in the illustrated retracted configuration the sod carriers 1156*a-e* are not equally spaced. Instead, the inner pair of sod carriers 1156*c* and 1156*e* are closely squeezed together so that the distances 1182 and 1186 are generally equal to each other, and are less than the distances 1184 and 1188 and the diameter 138 of the sod rolls 116 being carried. In this configuration, the sod carriers 1156*c* and 1156*e* each partially overlap the centre sod carrier 1156*a*, and block the sod carrier 1156 from being able to pick-up a sod roll.

Optionally, the sod carriers 1156*c* and 1156*e* can be positioned so that the sod rolls they are carrying can be brought into physical contact with each other, or can at least be very closely spaced to each other. In such configurations, the distance 1182 in the configuration shown in FIG. 39 can be less than about 75% of the distance 1182 when in the extended configuration of FIGS. 33-35.

Optionally, the sod handling apparatus 1150 (and apparatus 150) can be configured so that the centre sod carrier 1156*a* is fixed, and the other sod carriers 1156*b-d* are arranged in mirrored pairs on opposite sides of the sod carrier 1156*a*. For example, sod carriers 1156*c* and 1156*e* can be linked as a pair so that they move in unison toward and away from the centre sod carrier 1156*a*. Similarly, sod carriers 1156*b* and 1156*d* can be linked to move in unison. In such a configuration, the distances 1182 and 1186 will remain generally equal to each other in a variety of configurations, and the distances 1184 and 1188 will remain generally equal to each other. Optionally, each pair of sod carriers can be actuated independently of the other pair, such that sod carriers 1156*c* and 1156*e* can be moved relative to the centre carrier 1156*a* independently from sod carriers 1156*c* and 1156*e*.

Linking the sod carriers in this manner may help facilitate symmetry about centre sod carrier 1156*a*, while still allowing the distances 1182 and 1186 to be different than the distances 1184 and 1188. Providing different distances between the inner pair (1156*c* and 1156*e*) and the outer pair (1156*b* and 1156*d*) of sod carriers may allow the inner sod rolls (carried by 1156*c* and 1156*e*) to be very closely spaced while stacking, while the outer sod rolls (carried by 1156*b* and 1156*d*) can be spaced further apart, and disposed relatively closer to the edges of the pallet than would be achieved if the distances 1184 and 1188 were reduced to match 1182 and 1186. Providing a relatively wide placement of the outer sod rolls (i.e. in the carriers 1156*b* and 1156*d*) may help improve the stability of the stacked sod, and may help maintain a desired width of the layers toward the bottom of the pallet.

Optionally, the sod carriers 1156*b-d* can all be independently moveable, and the linking of the pairs (if any) can be achieved by coordinating the movement of each sod carrier 1156*b-d* using a suitable controller. Alternatively, the pairs of sod carriers can be linked physically, such that movement of the sod carrier 1156*c* results in a corresponding, and generally opposite movement of sod carrier 1156*e*. For example, the sod carriers 1156*c* and 1156*e* can be connected using a linkage so that moving sod carrier 1156*c* toward the sod carrier 1156*a* causes sod carrier 1156*e* to move inwardly toward sod carrier 1156*a* by a proportional (and optionally the same) amount, and moving carrier 1156*c* away from the sod carrier 1156*a* causes sod carrier 1156*e* to move outwardly away from sod carrier 1156*a* by a proportional (and optionally the same) amount. Sod carriers 1156*b* and 1156*d* can be linked in the same, or an analogous manner.

Referring to FIGS. 35 and 38, to move the second, third, fourth and fifth sod carriers 1156*b-e* along rails 1158, the sod handling apparatus 115 has an actuator mechanism that includes a first actuator that is operable to move sod carriers 1156*b* and 1156*d*, and a second actuator that is operable to move sod carriers 1156*c* and 1156*e*. The first and second actuators can be operable independently of each other, and can be operated simultaneously.

In the illustrated example, the first actuator includes a hydraulic cylinder 1190*a* that has a first end 1192*a* that is connected to the base plate 1162*d* of the sod carrier 1156*d*, and a second end 1194*a* that is connected to the head 1152. Extending and retracting the cylinder 1190*a* causes the sod carrier 1156*d* to move away from, and toward the centre sod carrier 1156*a*. The sod carrier 1156*d* is connected to a linkage member in the form of a timing belt 1320*a* using a clamp 1322*a*. The sod carrier 1156*b* is also connected to timing belt 1320*a* using a clamp 1324*a*. The timing belt 1320*a* is supported on pulleys 1326*a* (see also FIG. 37) so that movement of sod carrier 1156*d* causes the belt 1320*a* to translate, and thereby to urge the sod carrier 1156*b* to move in unison with sod carrier 1156*d*.

Similarly, in the illustrated example, the second actuator includes a hydraulic cylinder 1190*b* that has a first end 1192*b* that is connected to the base plate 1162*e* of the sod carrier 1156*e*, and a second end 1194*b* that is connected to the head 1152. Extending and retracting the cylinder 1190*b* causes the sod carrier 1156*e* to move away from, and toward the centre sod carrier 1156*a*. The sod carrier 1156*e* is connected to a linkage member in the form of a timing belt 1320*b* using a clamp 1322*b*. The sod carrier 1156*c* is also connected to timing belt 1320*b* using a clamp 1324*b*. The timing belt 1320*b* is supported on pulleys 1326*b* so that movement of sod carrier 1156*e* causes the belt 1320*b* to translate, and thereby urging the sod carrier 1156*c* to move in unison with sod carrier 1156*e*.

The actuators 1190*a* and 1190*b* can be extended to a variety of different positions, which can help facilitate positioning the sod carriers 1156*b-d* in a variety of different locations along the rails 1158. In this configuration, the sod handling apparatus 1150 may be generally continuously adjustable, which may help accommodate sod rolls of different sizes and for different stacking patterns. Optionally, the actuators 1190*a* and 1190*b* can be automatically controller by a controller (such as a PLC and/or a computer) and may be manually operated or adjusted by a human operator, or both. Configuring the sod handling apparatus 150 and/or 1150 as described may help facilitate the pick-up, transport and stacking of sod rolls in a variety of patterns, spacings and orientations, including the stacking patterns shown in FIGS. 2-7 and 28-32.

Referring again to FIG. 33, a schematic representation of the sod handling apparatus 150 is shown in use, stacking sod rolls 116 in the pattern as shown in FIGS. 27-32. Optionally, when stacking sod in this pattern, the first layer 308a may be entirely completed before stacking the second or subsequent layers. Alternatively, portions of the second layer 308b (and/or subsequent layers) may be stacked prior to completing the first layer 308a. For example, referring to FIG. 33, one example of a simplified schematic of a sod handling apparatus 150 (which may alternatively be apparatus 1150 or other suitable apparatus) is used to help illustrate how stacking of the layers 308a-308d can be completed. In this example, layer 308b has been completed, and row 310c had been stacked on top. As illustrated, four sod rolls 116 carried by the sod handling apparatus 150 can be positioned so that one pair of sod rolls 116 can be placed beside row 310c thereby forming part of layer 308c (on the right side of FIG. 33) while another pair of sod rolls 116 is placed on top of row 310c, thereby forming part of the next layer 308d (on the left of FIG. 33). Optionally, the four sod rolls 116 can be placed simultaneously and without requiring the sod handling apparatus 150 to be re-positioned relative to the pallet, and without requiring the sod handling apparatus to travel to the accumulator. To help facilitate this stacking pattern, the sod handling apparatus can be configured so that the distances 184 and 188 are approximately the same as the roll diameter 138 (about 8" as illustrated) and that the sum of distances 186 and 182 is slightly more than 2 times the roll diameter 138 (about 17" as illustrated). After depositing the rolls as illustrated, the sod handling apparatus 150 can return to the accumulator to pick up another four sod rolls. The sod handling apparatus 150 can then deposit those rolls as the next pairs of sod rolls on layers 308c and 308 (i.e. one pair beside row 310c and one pair on top of row 310c), thereby completing layer 308c, and leaving layer 308d lacking only row 310d to be completed.

Utilizing the capabilities of sod handling apparatuses may help reduce the number of trips that are required between the accumulator and the sod stacking region when stacking the sod rolls.

Figure 40:
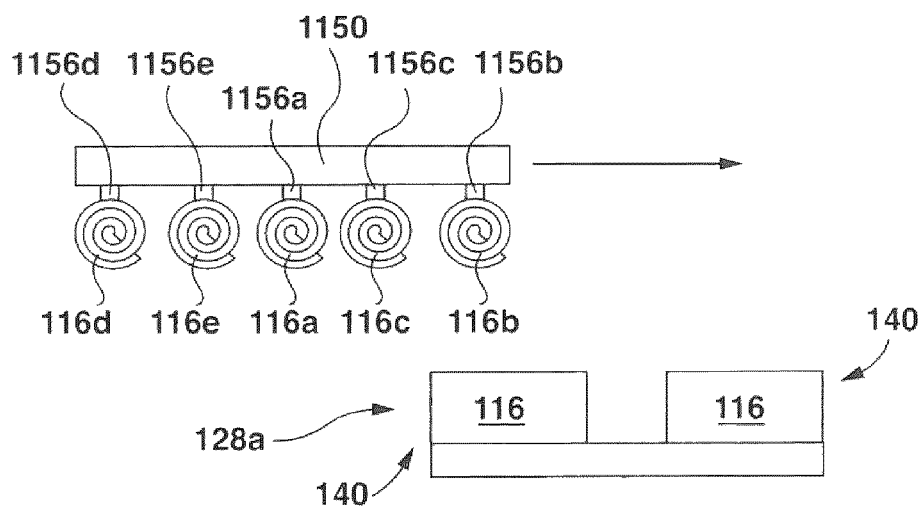
FIGS. 40-43 are schematic illustrations of steps in one method of stacking sod rolls.
Figure 41:
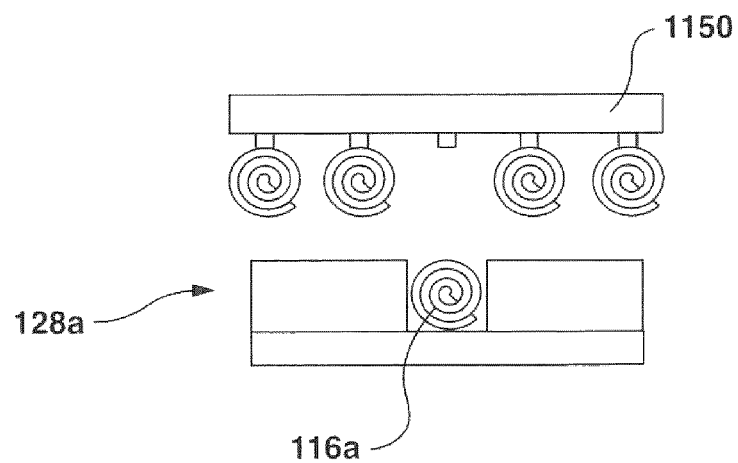
Figure 42:
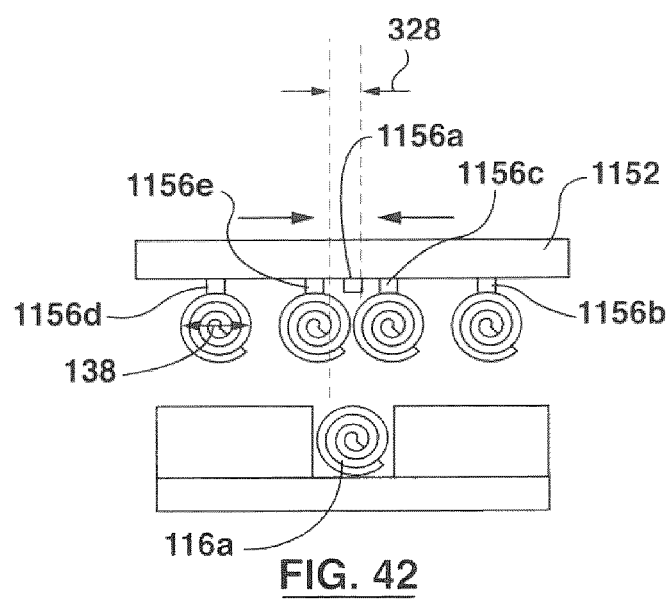
Figure 43:
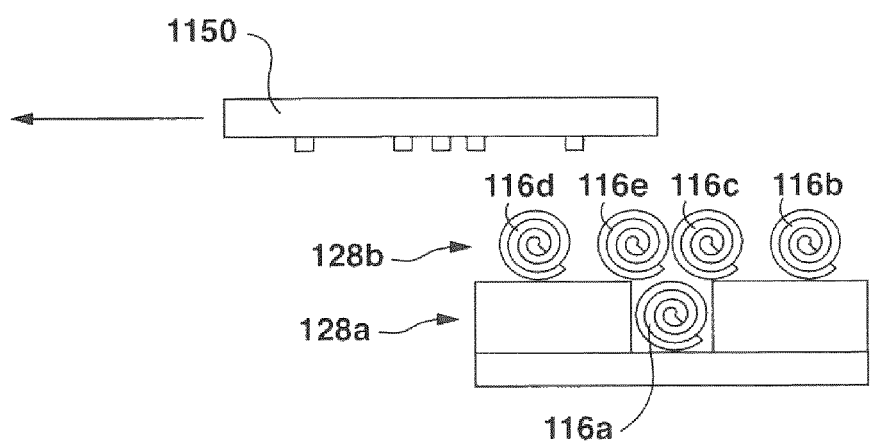

Referring to FIGS. 40-43, a schematic example of the sod handling apparatus 1150 is shown in use stacking sod rolls in accordance with the pattern of FIGS. 3-7. In this example, FIG. 40 shows the stack with outer rows 140 already in place and the sod handling apparatus 1150 approaching the stack carrying 5 sod rolls 116a-e in an extended configuration (see FIGS. 34-36). Once positioned over the stack (FIG. 41) the centre sod carrier 1156a can be actuated to deposit the sod roll 116a into the gap between rows 140. After depositing the centre roll 116a, the sod handling apparatus 1150 can be reconfigured into a contracted configuration (see FIGS. 37-39) by shifting the sod carriers 1156b-d, and sod rolls 116b-d, inwardly toward the centre sod carrier 1156a. In this example, the sod carriers 156c and 1156e are moved so that the sod rolls 116c and 116e are in contact with each other as shown in FIG. 42. In the illustrated example, the repositioning of the sod carriers 1156b-d between FIGS. 41 and 42 can optionally be accomplished without moving the head 1152 relative to the stack of sod or pallet 122b. After reconfiguring the sod handling apparatus 1150, the remaining four sod rolls 116b-d can be placed on the stack and can form part of the next layer (e.g. layer 128b). In this configuration, the sod rolls 116c and 116e each partially overlap the sod roll 116a, and the sod rolls 116b and 116d are spaced relatively far apart to help support the next layer (i.e. the spacing between rolls 116d and 116e is greater than the spacing between rolls 116e and 116c). In this process the sod rolls 116a-e can be released above the stack and can fall onto the stack under the influence of gravity, or optionally the sod handling apparatus 1150 can be translated downwardly to place the sod rolls on the stack (i.e. in physical contact with underlying sod rolls) before releasing them from the sod carriers 1156a-e (sod handling apparatus 150 can be operated in the same manner).

Optionally, when placing the sod roll 116a between the rows 140 it may be desirable to slightly offset the sod roll 116a from the gap between the rows, such that the sod roll 116a will contact at least one of the rows 140 when placed. If this technique is employed, the head 1152 may be slightly offset to one side, for example to the left, when completing the step shown in FIG. 41, and may then be shifted slightly, for example to the right, when performing the step shown in FIG. 42. This minor re-positioning is schematically represented by a positioning distance 328. The positioning distance 328 can be between about 0% and about 150% of the diameter 138 of the sod rolls being handled, and preferably is between about 0% and about 25%. Reducing the positioning distance may help facilitate relatively quick transitions between FIGS. 41 and 42, which may help speed up harvesting and stacking rates. This may also help facilitate completing these steps while keeping the sod handling apparatus 150 substantially within the perimeter of the pallet (i.e. not extending beyond the edge of the pallet by more than The capability to adjust the sod carriers 156a-e and 1156a-e as described herein, and more particularly the capability to position sod carriers 156c and 156e in close proximity to the centre sod carrier 156a, and also to each other, can help facilitate stacking sod rolls with relatively small movements of the head 152 relative to the stack. Configuring the sod carriers to be relatively narrow in the lateral direction (as shown in apparatuses 150 and 1150) is one way to help allow the sod carriers to be relatively closely spaced to each other. However, sod carriers of other designs can be configured to be relatively closely spaced with each other and/or used in combination with the heads 152 and 1152 to achieve the stacking patterns described above.

While illustrated having five sod carriers, the sod handling apparatuses described herein may be configured with more or fewer sod carriers. For example, the sod handling apparatus may be configured with three sod carriers (optionally with one fixed carrier and two moveable carriers), with seven sod carriers (optionally with one, central fixed carrier and 6 movable carriers) or with any other desired number of sod carriers to help facilitate stacking of sod rolls of a particular size, and/or stacking sod rolls on different sized receiving members (e.g. pallets, etc.).

In the illustrated example, each gripper includes two, generally opposing tines. Alternatively, a gripper may include only one tine, or more than two tines.

In the illustrated example, at least some of the sod carriers are movably mounted to the head. This allows the relative spacing between the sod carriers to be adjusted, which may help facilitate the stacking of sod rolls in a desired pattern on a pallet. Alternatively, in some embodiments the gripping mechanisms and other suitable aspects of the teachings described herein may be used in combination with non-movable sod carriers.

What has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A sod handling apparatus for picking up a sod roll, the sod roll being rolled about a roll axis, the sod handling apparatus comprising:
   a) a gripper positionable to grip the sod roll, the gripper comprising at least:
      i) a body member having a body axis that is parallel to the roll axis when the sod roll is engaged by the gripper;
      ii) a first elongate piercing member operably coupled to the body member and having a first tip at a distal end thereof, the first elongate piercing member being moveable between a retracted position spaced apart from the sod roll and an engaged position penetrating the sod roll, when the first elongate piercing member is moved between the retracted position and the engaged position, the first tip travels in a first piercing direction that is at a first angle of between about 0 degrees and about 45 degrees relative to the body axis; and
      iii) a second elongate piercing member operably coupled to the body member and generally opposing the first elongate piercing member and having a second tip at a distal end thereof, the second elongate piercing member being moveable between the retracted position and the engaged position, when the second elongate piercing member is moved between the retracted position and the engaged position, the second tip travels in a second piercing direction that is at a second angle of between greater than 0 degrees and about 45 degrees relative to the body axis; and
   b) an actuator operably coupled to the first and second elongate piercing members to move the first elongate piercing member between the retracted position and the engaged position and to move the second elongate piercing member between the retracted position and the engaged position.

2. The sod handling apparatus of claim 1, wherein at least one of the first angle and the second angle is between about 5 and 30 degrees.

3. The sod handling apparatus of claim 1, wherein when the first elongate piercing member moves from the retracted position to the engaged position, the first tip pierces an upper surface or an end face of the sod roll.

4. The sod handling apparatus of claim 1, wherein the gripper has a central plane that is orthogonal to the body axis, and wherein when the first elongate piercing member is in the retracted position, the first tip is on a first side of the central plane, and when the first elongate piercing member is in the engaged position, the first tip is on an opposed second side of the central plane.

5. The sod handling apparatus of claim 4, wherein when the second elongate piercing member is in the retracted position, the second tip is on the second side of the central plane, and when the second elongate piercing member is in the engaged position, the second tip is on the first side of the central plane.

6. The sod handling apparatus of claim 1, wherein the first angle is between about 5 and 30 degrees.

7. The sod handling apparatus of claim 1, wherein the first angle is about 15 degrees.

8. The sod handling apparatus of claim 1, wherein the second angle is between about 5 and 30 degrees.

9. The sod handling apparatus of claim 1, wherein the second angle is about 15 degrees.

10. The sod handling apparatus of claim 1, wherein the first piercing direction is parallel to the second piercing direction.

11. The sod handling apparatus of claim 1, wherein the actuator is operable to move the first and second elongate piercing members in unison.

* * * * *